(12) United States Patent
Fujita

(10) Patent No.: US 10,270,940 B2
(45) Date of Patent: Apr. 23, 2019

(54) IMAGE PROCESSING DEVICE, DRIVE CONTROL DEVICE, LIGHT SOURCE CONTROL DEVICE, IMAGE FORMING APPARATUS, AND IMAGE PROCESSING METHOD

(71) Applicant: Hayato Fujita, Kanagawa (JP)

(72) Inventor: Hayato Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/696,261

(22) Filed: Sep. 6, 2017

(65) Prior Publication Data

US 2018/0091697 A1    Mar. 29, 2018

(30) Foreign Application Priority Data

Sep. 28, 2016 (JP) .................................. 2016-189582

(51) Int. Cl.
*H04N 1/409* (2006.01)
*G03G 15/043* (2006.01)
*H04N 1/29* (2006.01)
*H04N 1/393* (2006.01)

(52) U.S. Cl.
CPC ......... *H04N 1/4092* (2013.01); *G03G 15/043* (2013.01); *H04N 1/295* (2013.01); *H04N 1/3935* (2013.01); *H04N 2201/0094* (2013.01)

(58) Field of Classification Search
None
See application file for complete search history.

(56) References Cited

U.S. PATENT DOCUMENTS

2012/0189328 A1  7/2012  Suzuki et al.
2014/0139603 A1  5/2014  Fujita et al.
2014/0176656 A1  6/2014  Omori et al.
(Continued)

FOREIGN PATENT DOCUMENTS

JP   2008-085487   4/2008
JP   2009-211546   9/2009
(Continued)

OTHER PUBLICATIONS

Machine translation for JP 2016-021664.*

*Primary Examiner* — Lennin R Rodriguezgonzalez
(74) *Attorney, Agent, or Firm* — Harness, Dickey & Pierce, P.L.C.

(57) ABSTRACT

An image processing device includes circuitry to: acquire an image matrix including a target pixel from first image data having a first resolution; determine whether one or more detection patterns match the image matrix; and perform edge enhancement on the target pixel and convert the first resolution into a second resolution to convert the target pixel into second image data, if the image matrix matches any of the one or more detection patterns. The first image data includes a plurality of pixels each including first and second pixel values respectively indicating image information and whether each of the plurality of pixels is an area where a specific object is drawn. The one or more detection patterns, each including a plurality of pixels each including the first and second pixel values, are patterns to detect a pixel forming an edge portion where the first and second pixel values vary between pixels.

20 Claims, 27 Drawing Sheets

(56) References Cited

U.S. PATENT DOCUMENTS

| | | | |
|---|---|---|---|
| 2014/0268186 A1* | 9/2014 | Iwata | G06K 15/1873 358/1.2 |
| 2014/0333941 A1 | 11/2014 | Iwata et al. | |
| 2014/0347708 A1 | 11/2014 | Omori et al. | |
| 2015/0125171 A1 | 5/2015 | Iwata et al. | |
| 2015/0156373 A1 | 6/2015 | Fujita et al. | |
| 2015/0180200 A1 | 6/2015 | Fujita et al. | |
| 2015/0251442 A1 | 9/2015 | Ishida et al. | |
| 2015/0324671 A1 | 11/2015 | Iwata et al. | |
| 2015/0350491 A1 | 12/2015 | Iwata et al. | |
| 2016/0012322 A1 | 1/2016 | Iwata et al. | |
| 2016/0147171 A1 | 5/2016 | Ishida et al. | |
| 2016/0234399 A1 | 8/2016 | Omori et al. | |
| 2016/0247050 A1 | 8/2016 | Fujita et al. | |
| 2016/0274521 A1 | 9/2016 | Iwata et al. | |
| 2017/0017177 A1 | 1/2017 | Iwata et al. | |

FOREIGN PATENT DOCUMENTS

| | | |
|---|---|---|
| JP | 2016-021664 | 2/2016 |
| JP | 2016-092526 | 5/2016 |

\* cited by examiner

FIG. 11
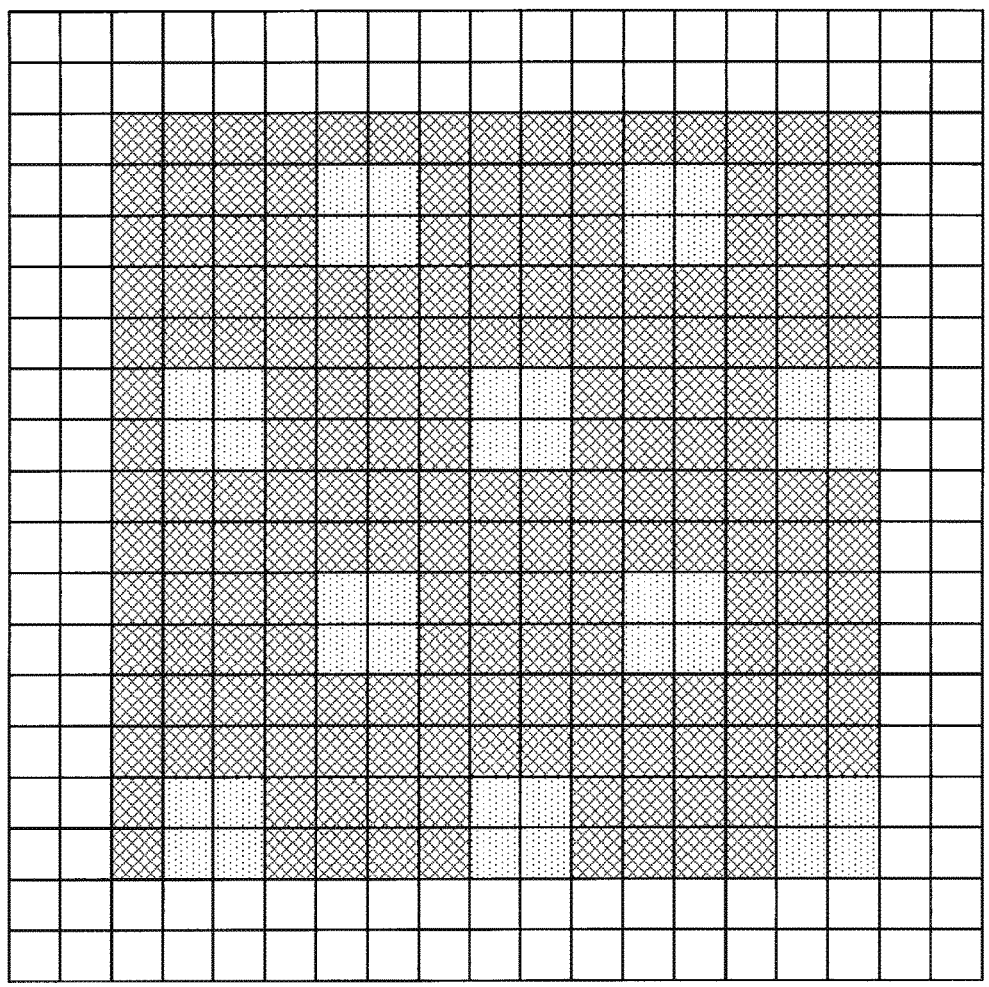
FIG. 12A  FIG. 12B  FIG. 12C  FIG. 12D
 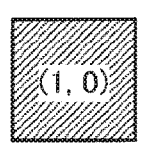 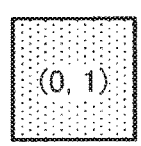 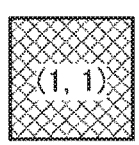

FIG. 47A
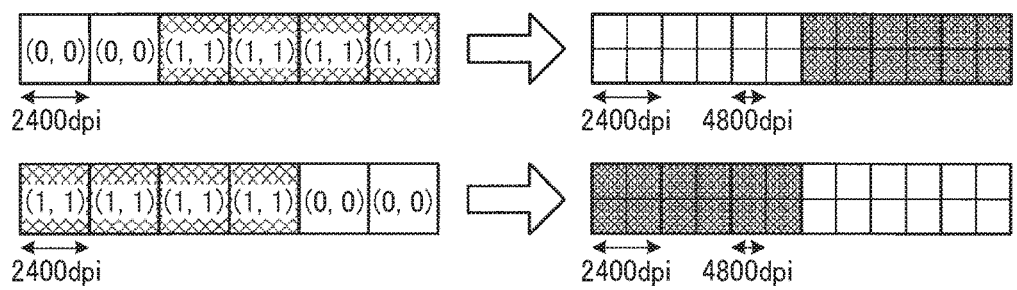
FIG. 47B
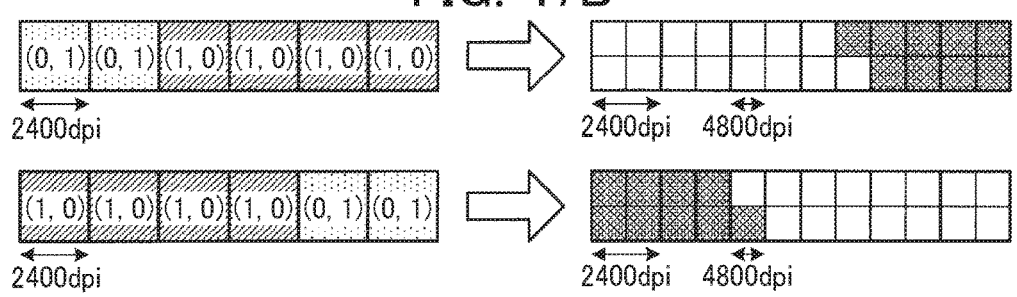
FIG. 47C
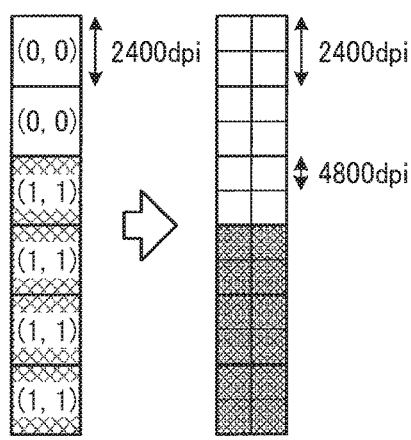
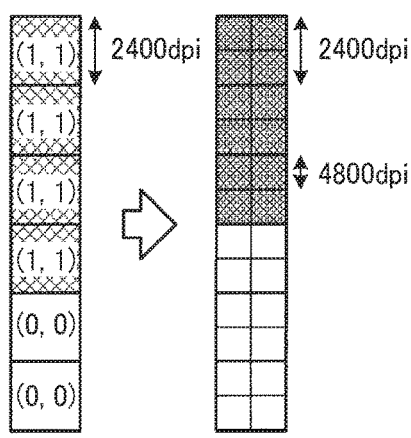
FIG. 47D
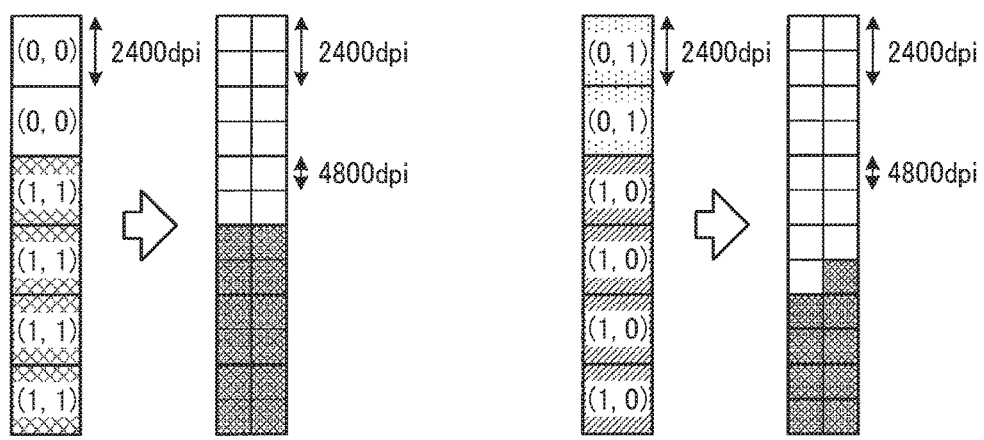
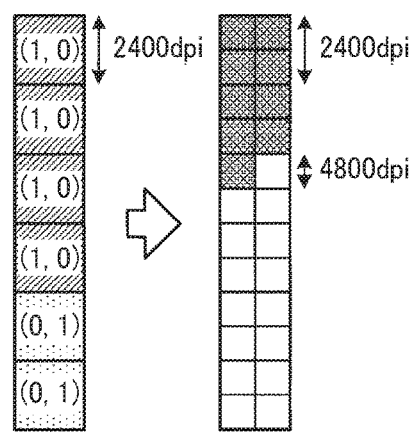

IMAGE PROCESSING DEVICE, DRIVE CONTROL DEVICE, LIGHT SOURCE CONTROL DEVICE, IMAGE FORMING APPARATUS, AND IMAGE PROCESSING METHOD

CROSS-REFERENCE TO RELATED APPLICATION

This patent application is based on and claims priority pursuant to 35 U.S.C. § 119(a) to Japanese Patent Application No. 2016-189582, filed on Sep. 28, 2016, in the Japan Patent Office, the entire disclosure of which is hereby incorporated by reference herein.

BACKGROUND

Technical Field

Embodiments of the present disclosure generally relate to an image processing device, a drive control device, a light source control device, an image forming apparatus, and an image processing method.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical writer irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium either directly, or indirectly via an intermediate transfer belt. Finally, a fixing device applies heat and pressure to the recording medium bearing the toner image to fix the toner image onto the recording medium. Thus, an image is formed on the recording medium.

Such image forming apparatuses employ image processing technology to thin text, lines, or the like, as edge enhancement, to prevent the text, lines, or the like, from being thickened.

SUMMARY

In one embodiment of the present disclosure, a novel image processing device includes circuitry to acquire an image matrix corresponding to an area including a target pixel and pixels surrounding the target pixel from first image data having a first resolution. The first image data includes a plurality of pixels, each of which includes a first pixel value indicating image information and a second pixel value indicating whether each of the plurality of pixels is an area in which a specific object is drawn. The circuitry determines whether one or more detection patterns match the image matrix thus acquired. Each of the one or more detection patterns includes a plurality of pixels. Each of the plurality of pixels includes the first pixel value and the second pixel value. Each of the one or more detection patterns is a pattern to detect a pixel forming an edge portion in which each of the first pixel value and the second pixel value varies between pixels. The circuitry performs edge enhancement on the target pixel and performs resolution conversion to convert the first resolution into a second resolution higher than the first resolution, to convert the target pixel into second image data, if the image matrix matches any of the one or more detection patterns.

Also described are a novel drive control device incorporating the image processing device, a novel light source control device incorporating the drive control device, a novel image forming device incorporating the light source control device, and a novel image processing method.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein:

FIG. 11 is a diagram of a specific object drawn by dots;

FIG. 12A is a first example of a pixel;

FIG. 12B is a second example of the pixel;

FIG. 12C is a third example of the pixel;

FIG. 12D is a fourth example of the pixel;

FIG. 18A is a diagram of a first example of a first type of detection pattern;

FIG. 18B is a second example of the first type of detection pattern;

FIG. 18C is a diagram of a third example of the first type of detection pattern;

FIG. 32A is a diagram of a first example of a second type of detection pattern;

FIG. 32B is a second example of the second type of detection pattern;

FIG. 32C is a diagram of a third example of the second type of detection pattern;

FIG. 47A is a diagram of a variation of the line thinning performed on a first set of blocks of pixels in a lateral direction;

FIG. 47B is a diagram of the variation of the line thinning performed on a second set of blocks of pixels in the lateral direction;

FIG. 47C is a diagram of the variation of the line thinning performed on a third set of blocks of pixels in a vertical direction;

FIG. 47D is a diagram of the variation of the line thinning performed on a fourth set of blocks of pixels in the vertical direction;

FIG. 48A is a diagram of a detection pattern to detect a far-edge pixel when black pixels construct text, a line, or a graphical shape and white pixels construct a background;

FIG. 48B is a diagram of a detection pattern to detect an adjacent edge pixel when black pixels construct text, a line, or a graphical shape and white pixels construct a background;

FIG. 49A is a diagram of a detection pattern to detect a far-edge pixel when white pixels construct text, a line, or a graphical shape and black pixels construct a background;

FIG. 49B is a diagram of a detection pattern to detect an adjacent edge pixel when white pixels construct text, a line, or a graphical shape and black pixels construct a background;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
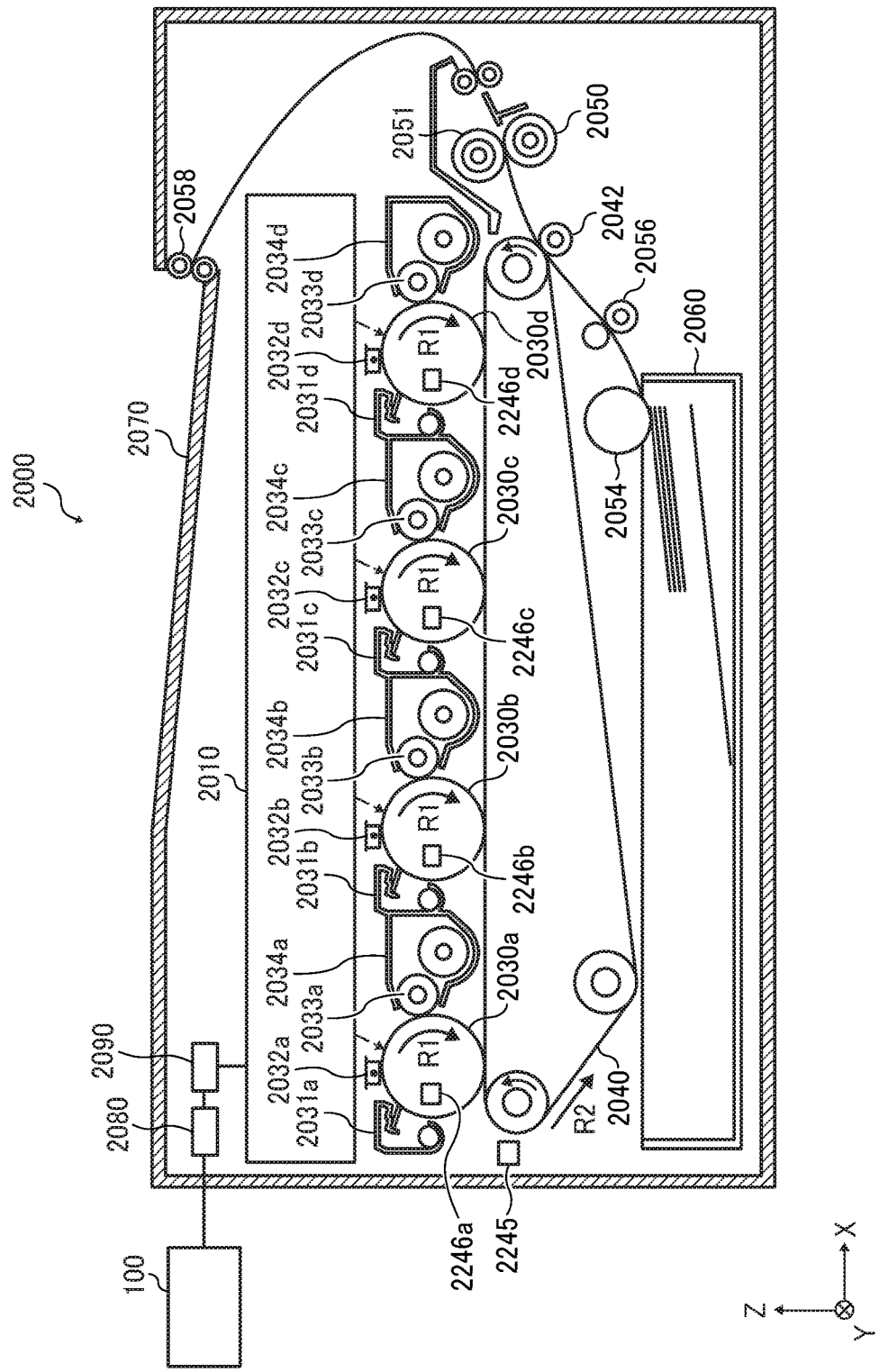
FIG. 1 is a schematic view of an image forming apparatus according to an embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes K, C, M, and Y denote colors black, cyan, magenta, and yellow, respectively. To simplify the description, these suffixes are omitted unless necessary.

Referring now to the drawings, a description is given of an image processing device, a drive control device, a light source control device, an image forming apparatus, and an image forming method according to embodiments of the present disclosure.

Initially, a description is given of an image forming apparatus according to an embodiment of the present disclosure. The image forming apparatus may be a copier, a facsimile machine, a printer, a multifunction peripheral (MFP) having at least two of copying, printing, scanning, facsimile, and plotter functions, or the like. According to an embodiment of the present disclosure, the image forming apparatus is a color printer (hereinafter referred to as an image forming apparatus 2000) that forms color and monochrome toner images on a recording medium by electrophotography. Alternatively, the image forming apparatus may be a monochrome printer that forms a monochrome toner image on a recording medium.

Now, a description is given of a first embodiment.

FIG. 1 is a schematic view of the image forming apparatus 2000.

The image forming apparatus 2000 transfers toner to a sheet as a recording medium to produce a printed matter. Specifically, the image forming apparatus 2000 is a multicolor printer employing a tandem structure in which image forming devices for forming toner images in different colors are aligned. More specifically, the image forming devices respectively form black, cyan, magenta, and yellow toner images, which are superimposed one atop another and formed as a composite, full-color toner image.

As illustrated in FIG. 1, the image forming apparatus 2000 includes an optical scanner 2010 as a light source control device, four photoconductor drums 2030a, 2030b, 2030c, and 2030d (hereinafter collectively referred to as photoconductor drums 2030), four cleaners 2031a, 2031b, 2031c, and 2031d (hereinafter collectively referred to as cleaners 2031), four chargers 2032a, 2032b, 2032c, and 2032d (hereinafter collectively referred to as chargers 2032), four developing rollers 2033a, 2033b, 2033c, and 2033d (hereinafter collectively referred to as developing rollers 2033), and four toner cartridges 2034a, 2034b, 2034c, and 2034d (hereinafter collectively referred to as toner cartridges 2034). The image forming apparatus 2000 further includes a transfer belt 2040, a transfer roller 2042, a fixing roller 2050, a pressure roller 2051, a sheet feeding roller 2054, a registration roller pair 2056, a sheet ejection roller pair 2058, a sheet tray 2060, an output tray 2070, a communication controller 2080, a density detector 2245, four home position sensors 2246a, 2246b, 2246c, and 2246d (hereinafter collectively referred to as home position sensors 2246), and a printer controller 2090.

The communication controller 2080 controls bidirectional communication with an upstream device 100 (e.g., computer) through a network or the like.

The printer controller 2090 generally controls the foregoing components of the image forming apparatus 2000. The printer controller 2090 includes, e.g., a central processing unit (CPU), a read only memory (ROM), a random access memory (RAM), and an analog-to-digital (A/D) converter. The ROM holds a program described by codes that the CPU executes and various kinds of data that is used for execution of the program. The RAM is a working memory. The A/D converter converts analog data to digital data. The printer controller 2090 controls the components of the image forming apparatus 2000 in response to a request from the upstream device 100 while transmitting image data from the upstream device 100 to the optical scanner 2010.

In the present embodiment, the photoconductor drum 2030a, the charger 2032a, the developing roller 2033a, the toner cartridge 2034a, and the cleaner 2031a operate as a set of devices to form a black toner image, herein referred to as an image forming station K.

Similarly, the photoconductor drum 2030b, the charger 2032b, the developing roller 2033b, the toner cartridge 2034b, and the cleaner 2031b operate as a set of devices to form a cyan toner image, herein referred to as an image forming station C.

The photoconductor drum 2030c, the charger 2032c, the developing roller 2033c, the toner cartridge 2034c, and the cleaner 2031c operate as a set of devices to form a magenta toner image, herein referred to as an image forming station M.

The photoconductor drum 2030d, the charger 2032d, the developing roller 2033d, the toner cartridge 2034d, and the cleaner 2031d operate as a set of devices to form a yellow toner image, herein referred to as an image forming station Y.

Each of the photoconductor drums 2030 functions as an image bearer on which a latent image is written according to light emission of a light source based on a modulation signal described later. A photosensitive layer is formed on the surface of each of the photoconductor drums 2030 as image bearers. The optical scanner 2010 scans the surface of each of the photoconductor drums 2030. The photoconductor drums 2030a, 2030b, 2030c, and 2030d are aligned, having parallel axes, and rotate in identical directions. In the present embodiment, the photoconductor drums 2030a, 2030b, 2030c, and 2030d rotates in a clockwise direction (hereinafter referred to as a direction of rotation R1) illustrated in FIG. 1.

It is to be noted that, in three dimensional orthogonal coordinates XYZ, a direction of an X-axis (hereinafter referred to as a direction X) is a direction in which the four photoconductor drums 2030 are aligned. A direction of a Y-axis (hereinafter referred to as a direction Y) is parallel to an axial direction of each of the photoconductor drums 2030.

Each of the chargers 2032 uniformly charges the surface of the corresponding photoconductor drum 2030. According to image data, the optical scanner 2010 irradiates the charged surface of the photoconductor drums 2030 with light. Specifically, according to black image data, cyan image data, magenta image data, and yellow image data, the optical scanner 2010 irradiates the charged surface of the photoconductor drums 2030a, 2030b, 2030c, and 2030d with light beams modulated for black, cyan, magenta, and yellow, respectively. Irradiation of the surface of each of the photoconductor drums 2030 eliminates the charge of an irradiated portion on the surface of each of the photoconductor drums 2030, forming a latent image thereon according to the image data. As each of the photoconductor drums 2030 rotates, the latent image thus formed thereon moves to a position where the latent image faces the corresponding developing roller 2033. It is to be noted that a detailed description of a configuration of the optical scanner 2010 is deferred.

On each of the photoconductor drums 2030, an area in which the latent image is written according to the image data is herein referred to as an effective scanning area, an image forming area, an effective image area, or the like.

The toner cartridge 2034a accommodates black toner. The black toner is supplied to the developing roller 2033a. Similarly, the toner cartridge 2034b accommodates cyan toner. The cyan toner is supplied to the developing roller 2033b. The toner cartridge 2034c accommodates magenta toner. The magenta toner is supplied to the developing roller 2033c. The toner cartridge 2034d accommodates yellow toner. The yellow toner is supplied to the developing roller 2033d.

As each of the developing rollers 2033 rotates, the toner supplied from the corresponding toner cartridge 2034 is applied thinly and uniformly to the surface of the developing roller 2033. When the toner on the surface of each of the developing rollers 2033 contacts the surface of the corresponding photoconductor drum 2030, the toner moves and adheres to the irradiated portion on the surface of the photoconductor drum 2030. In other words, each of the developing rollers 2033 allows the toner to adhere to the latent image formed on the surface of the corresponding photoconductor drum 2030, rendering the latent image visible as a toner image. In the present embodiment, each of the developing rollers 2033 functions as a developing device, which supplies toner to the latent image written on the image bearer to develop the latent image into a visible toner image. Thus, a toner image is formed on the surface of each of the photoconductor drums 2030.

The transfer belt 2040 is entrained around a belt rotation mechanism, to rotate in a given direction. The surface of each of the photoconductor drums 2030a. 2030b, 2030c, and 2030d contacts an outer circumferential surface of the transfer belt 2040 at a position opposite a position where the surface of each of the photoconductor drums 2030a, 2030b, 2030c, and 2030d faces the optical scanner 2010. The transfer roller 2042 also contacts the outer circumferential surface of the transfer belt 2040.

As each of the photoconductor drums 2030 rotates, the toner image formed on the surface of each of the photoconductor drums 2030 approaches the transfer belt 2040. In a primary transfer process, black, cyan, magenta, and yellow toner images are timed to be transferred sequentially onto the transfer belt 2040 such that the black, cyan, magenta, and yellow toner images are superimposed one atop another on the transfer belt 2040 that rotates in a counterclockwise direction R2 (hereinafter referred to as a direction of rotation R2) illustrated in FIG. 1. Thus, a composite color toner image is formed on the transfer belt 2040. As the transfer belt 2040 rotates, the composite color toner image formed on the transfer belt 2040 approaches the transfer roller 2042.

In a lower portion of the image forming apparatus 2000 is the sheet tray 2060 that accommodates recording media. The sheet feeding roller 2054 is disposed adjacent to the sheet tray 2060. The sheet feeding roller 2054 picks up the recording media one at a time from the sheet tray 2060 to feed the recording medium to the registration roller pair 2056.

Activation of the registration roller pair 2056 is timed to convey the recording medium to an area of contact, herein referred to as a secondary transfer nip, between the transfer belt 2040 and the transfer roller 2042 such that the recording medium meets the color toner image formed on the transfer belt 2040 at the secondary transfer nip. Accordingly, in a secondary transfer process, the color toner image is transferred onto the recording medium from the transfer belt 2040 at the secondary transfer nip. It is to be noted that, in the present embodiment, the transfer belt 2040 and the transfer roller 2042 function as a transfer device to transfer the visible toner image, into which the latent image is developed by the developing device, onto a recording medium. The recording medium bearing the color toner image is then conveyed to an area of contact, herein referred to as a fixing nip, between the fixing roller 2050 and the pressure roller 2051.

At the fixing nip, the fixing roller 2050 and the pressure roller 2051 apply heat and pressure to the recording medium to fix the toner image onto the recording medium. It is to be noted that, in the present embodiment, the fixing roller 2050 and the pressure roller 2051 function as a fixing device to fix the toner image transferred by the transfer device onto the recording medium. The recording medium bearing the fixed toner image is conveyed to the sheet ejection roller pair 2058. The sheet ejection roller pair 2058 ejects the recording medium onto the output tray 2070. Thus, a plurality of recording media lies stacked on the output tray 2070.

Each of the cleaners 2031 removes residual toner from the surface of the corresponding photoconductor drum 2030. The residual toner is toner that has failed to be transferred onto the transfer belt 2040 and therefore is remaining on the surface of the photoconductor drum 2030. Thus, each of the cleaners 2031 cleans the surface of the corresponding photoconductor drum 2030. As each of the photoconductor drums 2030 rotates, the cleaned surface of each of the photoconductor drums 2030 returns to a position where the surface of each of the photoconductor drum 2030 faces the corresponding charger 2032.

The density detector 2245 is disposed on a negative (−) X side of the transfer belt 2040 in FIG. 1. Specifically, the density detector 2245 is disposed upstream from the transfer roller 2042 and downstream from the four photoconductor drums 2030 in the direction of rotation R2 of the transfer belt 2040.

Figure 2:
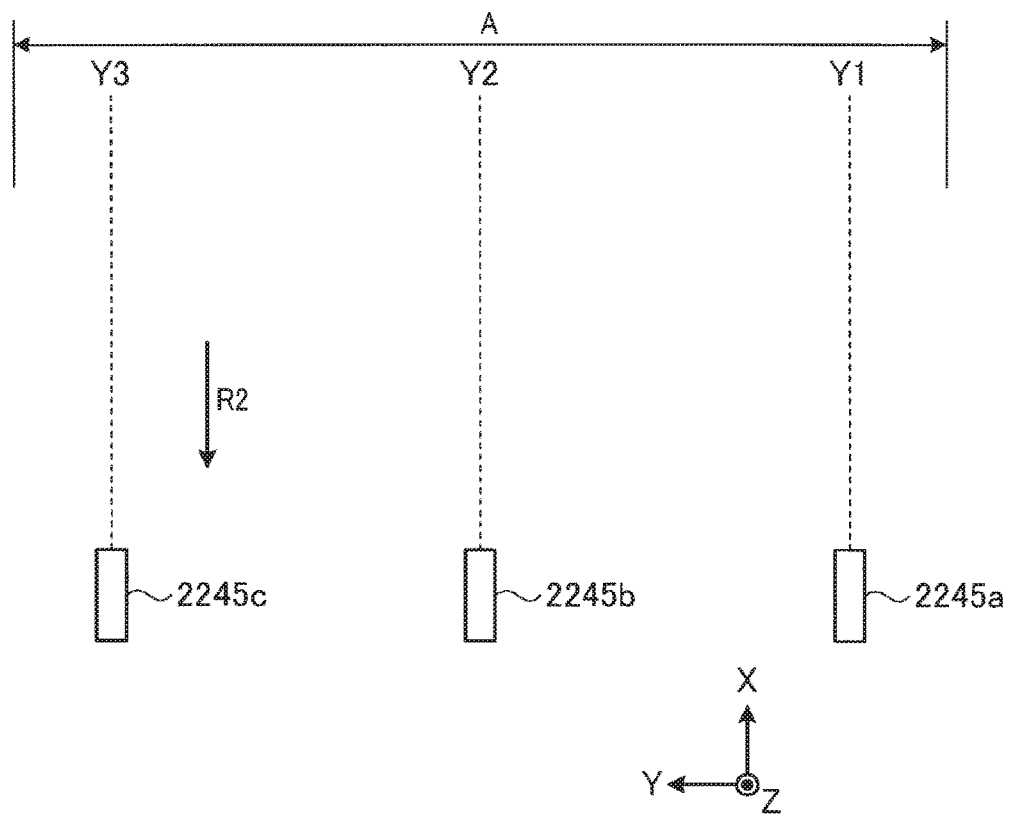
FIG. 2 is a diagram illustrating relative positions of optical sensors incorporated in the image forming apparatus of FIG. 1.
Figure 3:
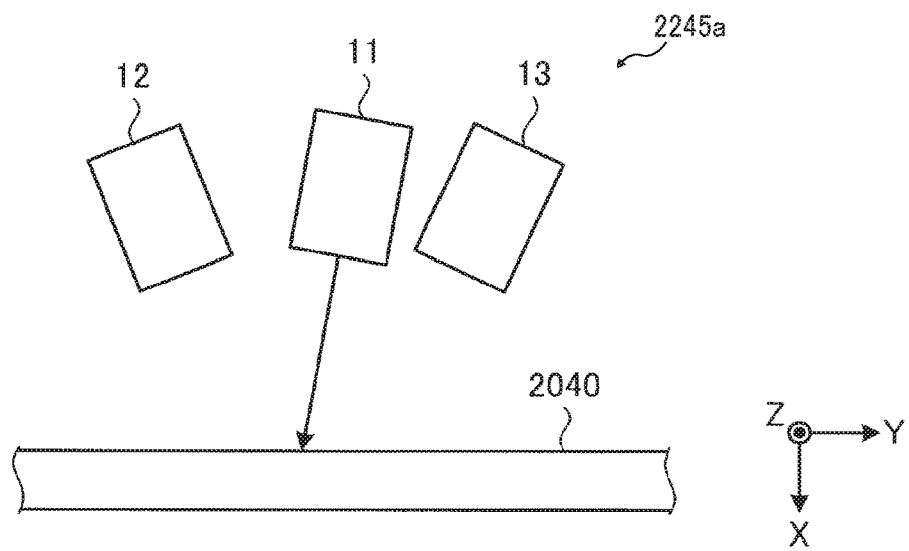
FIG. 3 is a schematic view of an optical sensor and a transfer belt incorporated in the image forming apparatus of FIG. 1, particularly illustrating a configuration of the optical sensor.

Referring now to FIGS. 2 and 3, a description is given of the density detector 2245.

FIG. 2 is a diagram illustrating relative positions of three optical sensors 2245a, 2245b, and 2245c, which construct the density detector 2245 in the present example. FIG. 3 is a schematic view of the optical sensor 2245a and the transfer belt 2040, particularly illustrating a configuration of the optical sensor 2245a.

Specifically, the optical sensor 2245a is disposed opposite a vicinity of an end portion on a negative (−) Y side within an effective image area A on the transfer belt 2040. In other words, the optical sensor 2245a is disposed opposite an end side of the transfer belt 2040 in a width direction thereof. The optical sensor 2245c is disposed opposite a vicinity of an end portion on a positive (+) Y side within the effective image area A on the transfer belt 2040. In other words, the optical sensor 2245c is disposed opposite the other end side of the transfer belt 2040 in the width direction thereof. The optical sensor 2245b is disposed substantially at a middle position between the optical sensors 2245a and 2245c with respect to a main scanning direction. In other words, the optical sensor 2245b is disposed opposite a substantially middle position of the transfer belt 2040 in the width direction thereof. FIG. 2 illustrates Y1, Y2, and Y3 as center positions of the optical sensors 2245a, 2245b, and 2245c, respectively, with respect to the main scanning direction, that is, the direction Y.

FIG. 3 illustrates the configuration of the optical sensor 2245a, as a representative of the optical sensors 2245a, 2245b, and 2245c all having identical configurations. The optical sensor 2245a includes, a light emitting diode (LED) 11, a specularly reflected light receiving device 12, and a diffusely reflected light receiving device 13. The LED 11 emits light (hereinafter referred to as detection light) toward the transfer belt 2040. The specularly reflected light receiving device 12 receives light specularly reflected from the transfer belt 2040 or a toner pad on the transfer belt 2040. The diffusely reflected light receiving device 13 receives light diffusely reflected from the transfer belt 2040 or the toner pad on the transfer belt 2040. Each of the specularly reflected light receiving device 12 and the diffusely reflected light receiving device 13 outputs a signal (i.e., photoelectric conversion signal) corresponding to an amount of light thus received.

Referring back to FIG. 1, a description is now given of the home position sensors 2246. The home position sensor 2246a detects a home position of rotation of the photoconductor drum 2030a. Similarly, the home position sensor 2246b detects a home position of rotation of the photoconductor drum 2030b. The home position sensor 2246c detects a home position of rotation of the photoconductor drum 2030c. The home position sensor 2246d detects a home position of rotation of the photoconductor drum 2030d.

To provide a fuller understanding of the embodiments of the present disclosure, a description is now given of the optical scanner 2010.

Initially with reference to FIGS. 4 through 7, a description is given of an optical system structure of the optical scanner 2010.

Figure 4:
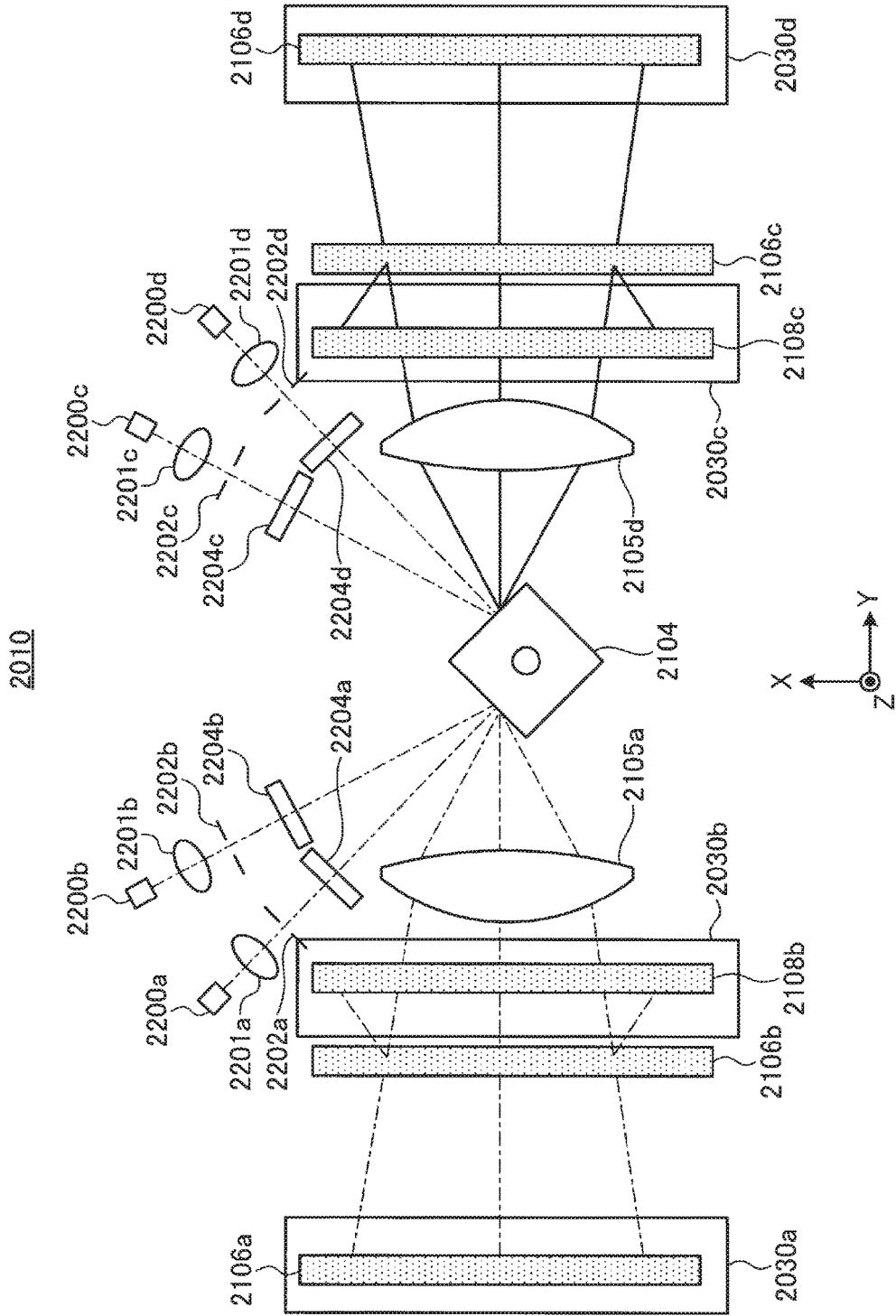
FIG. 4 is a top view of an optical scanner incorporated in the image forming apparatus of FIG. 1.
Figure 5:
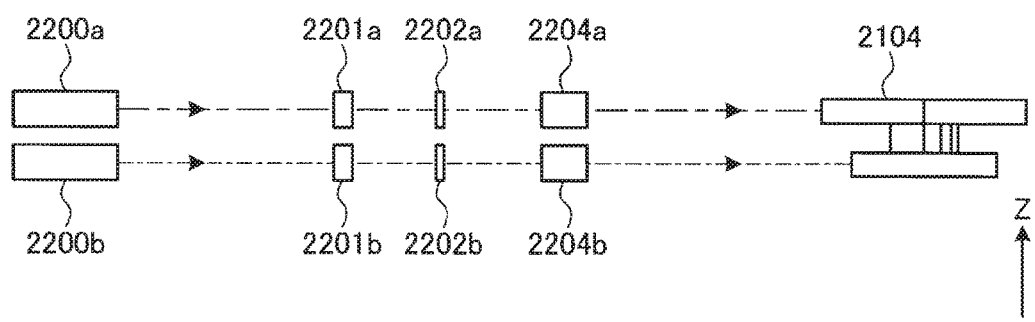
FIG. 5 is a partial side view of the optical scanner, illustrating optical paths from light sources to a polygon mirror.
Figure 6:
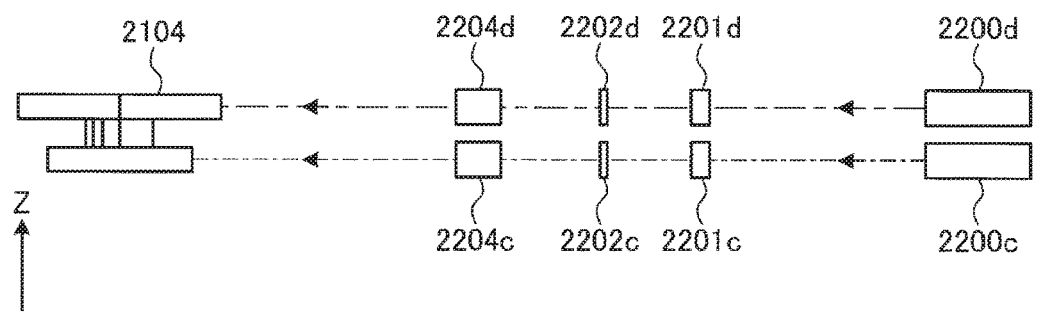
FIG. 6 is a partial side view of the optical scanner, illustrating optical paths from other light sources to the polygon mirror.
Figure 7:
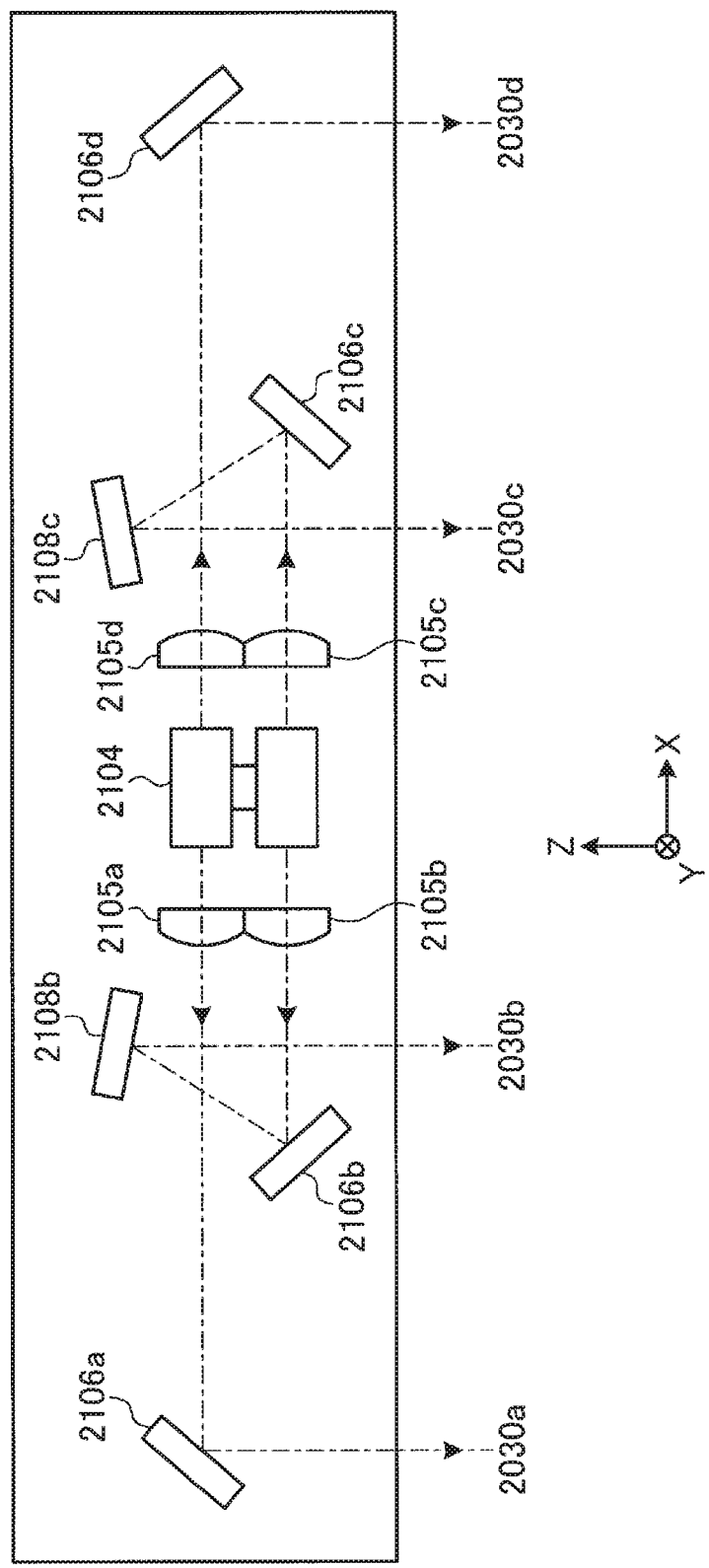
FIG. 7 is a partial side view of the optical scanner, illustrating optical paths from the polygon mirror to photoconductor drums.

FIG. 4 is a top view of the optical scanner 2010. FIG. 5 is a partial side view of the optical scanner 2010, illustrating an optical path from a light source 2200a to a polygon mirror 2104 and an optical path from a light source 2200b to the polygon mirror 2104. FIG. 6 is a partial side view of the optical scanner 2010, illustrating an optical path from a light source 2200c to the polygon mirror 2104 and an optical path from a light source 2200d to the polygon mirror 2104. FIG. 7 is a partial side view of the optical scanner, illustrating optical paths from the polygon mirror 2104 to the respective photoconductor drums 2030.

As illustrated in FIG. 4, an optical system of the optical scanner 2010 includes, e.g., the four light sources 2200a, 2200b, 2200c, and 2200d, four coupling lenses 2201a, 2201b, 2201c, and 2201d, four aperture plates 2202a, 2202b, 2202c, and 2202d, four cylindrical lenses 2204a, 2204b, 2204c, and 2204d, the polygon mirror 2104, four scanning lenses 2105a, 2105b, 2105c, and 2105d, and six deflection mirrors 2106a, 2106b, 2106c, 2106d, 2108b, and 2108c. The foregoing optical elements are installed at predetermined positions in an optical housing.

It is to be noted that the optical scanner 2010 also includes an electrical circuit. A description of the electrical circuit of the optical scanner 2010 is deferred with reference to FIG. 8 and the following drawings.

Each of the light sources 2200a, 2200b, 2200c, and 2200d includes, e.g., a surface emitting laser array, in which a plurality of light emitting units are arranged in a two-dimensional array. The light emitting units of the surface emitting laser array are disposed such that the light emitting units are arrayed at equal intervals when all the light emitting units are orthogonally projected along a virtual line that extends in a direction corresponding to a sub-scanning direction. Each of the light sources 2200a, 2200b, 2200c, and 2200d is, e.g., a laser array of vertical cavity surface emitting lasers (VCSELs).

The coupling lens 2201a is disposed on the optical path of light beams emitted from the light source 2200a, rendering the optical beams passing through the coupling lens 2201a into parallel light beams. Similarly, the coupling lens 2201b is disposed on the optical path of light beams emitted from the light source 2200b, rendering the optical beams passing through the coupling lens 2201b into parallel light beams. The coupling lens 2201c is disposed on the optical path of light beams emitted from the light source 2200c, rendering the optical beams passing through the coupling lens 2201c into parallel light beams. The coupling lens 2201d is disposed on the optical path of light beams emitted from the light source 2200d, rendering the optical beams passing through the coupling lens 2201d into parallel light beams.

The aperture plate 2202a has an opening to limit the amount of the parallel light beams coming from the coupling lens 2201a. Similarly, the aperture plate 2202b has an opening to limit the amount of the parallel light beams coming from the coupling lens 2201b. The aperture plate 2202c has an opening to limit the amount of the parallel light beams coming from the coupling lens 2201c. The aperture plate 2202d has an opening to limit the amount of the parallel light beams coming from the coupling lens 2201d.

The cylindrical lens 2204a images the light beams passing through the opening of the aperture plate 2202a on a deflection surface of the polygon mirror 2104 or on an area adjacent thereto, in a direction of a Z-axis (hereinafter referred to as a direction Z). Similarly, the cylindrical lens 2204b images the light beams passing through the opening of the aperture plate 2202b on a deflection surface of the polygon mirror 2104 or on an area adjacent thereto, in the direction Z. The cylindrical lens 2204c images the light beams passing through the opening of the aperture plate 2202c on a deflection surface of the polygon mirror 2104 or on an area adjacent thereto, in the direction Z. The cylindrical lens 2204d images the light beams passing through the opening of the aperture plate 2202d on a deflection surface of the polygon mirror 2104 or on an area adjacent thereto, in the direction Z.

The coupling lens 2201a, the aperture plate 2202a, and the cylindrical lens 2204a construct a pre-deflector optical system for the image forming station K. Similarly, the coupling lens 2201b, the aperture plate 2202b, and the cylindrical lens 2204b construct a pre-deflector optical system for the station C. The coupling lens 2201c, the aperture plate 2202c, and the cylindrical lens 2204c construct a pre-deflector optical system for the station M. The coupling lens 2201d, the aperture plate 2202d, and the cylindrical lens 2204d construct a pre-deflector optical system for the station Y.

The polygon mirror 2104 has a two-story structure, each having a four-sided mirror, rotatable about an axis parallel to the Z-axis. The four-sided mirror includes four deflection surfaces. The four-sided mirror on a first story (i.e., lower story) of the polygon mirror 2104 deflects the light beams from the cylindrical lens 2204b and the light beams from the cylindrical lens 2204c. On the other hand, the four-sided mirror on a second story (i.e., upper story) of the polygon mirror 2104 deflects the light beams from the cylindrical lens 2204a and the light beams from the cylindrical lens 2204d.

The polygon mirror 2104 deflects the light beams from the cylindrical lens 2204a and the light beams from the cylindrical lens 2204b to the −X side of the polygon mirror 2104, that is, in a negative (−) direction or on a negative (−) side of the X-axis from where the polygon mirror 2104 is situated. On the other hand, the polygon mirror 2104 deflects the light beams from the cylindrical lens 2204c and the light beams from the cylindrical lens 2204d to a positive (+) X side of the polygon mirror 2104, that is, in a positive (+) direction or on a positive (+) side of the X-axis from where the polygon mirror 2104 is situated.

The scanning lenses 2105a, 2105b, 2105c, and 2105d have optical power to condense the light beams to the photoconductor drums 2030a, 2030b, 2030c, and 2030d, respectively, or to an area adjacent to the photoconductor drums 2030a, 2030b, 2030c, and 2030d, respectively. The scanning lenses 2105a, 2105b, 2105c, and 2105d also have optical power to move an optical spot on the photoconductor drums 2030a, 2030b, 2030c, and 2030d, respectively, at a constant speed in the main scanning direction in accordance with rotation of the polygon mirror 2104.

The scanning lenses 2105a and 2105b are disposed on the −X side of the polygon mirror 2104. On the other hand, the scanning lenses 2105c and 2105d are disposed on the +X side of the polygon mirror 2104.

The scanning lens 2105a rests on the scanning lens 2105b in the direction Z. The scanning lens 2105b is disposed opposite the four-sided mirror on the first story of the polygon mirror 2104. On the other hand, the scanning lens 2105a is disposed opposite the four-sided mirror on the second story of the polygon mirror 2104.

Similarly, the scanning lens 2105d rests on the scanning lens 2105c in the direction Z. The scanning lens 2105c is disposed opposite the four-sided mirror on the first story of the polygon mirror 2104. On the other hand, the scanning lens 2105d is disposed opposite the four-sided mirror on the second story of the polygon mirror 2104.

The light beams passing through the cylindrical lens 2204a and deflected by the polygon mirror 2104 reaches the photoconductor drum 2030a via the scanning lens 2105a and the deflection mirror 2106a, to form an optical spot on the photoconductor drum 2030a. As the polygon mirror 2104 rotates, the optical spot moves in a longitudinal direction of the photoconductor drum 2030a, that is, the axial direction thereof. Thus, the surface of the photoconductor drum 2030a is scanned. The direction in which the optical spot moves is the "main scanning direction" on the photoconductor drum 2030a. The direction of rotation of the photoconductor drum 2030a (i.e., direction of rotation R1 illustrated in FIG. 1) is the "sub-scanning direction" on the photoconductor drum 2030a.

Similarly, the light beams passing through the cylindrical lens 2204b and deflected by the polygon mirror 2104 reaches the photoconductor drum 2030b via the scanning lens 2105b and the deflection mirrors 2106b and 2108b, to form an optical spot on the photoconductor drum 2030b. As the polygon mirror 2104 rotates, the optical spot moves in a longitudinal direction of the photoconductor drum 2030b, that is, the axial direction thereof. Thus, the surface of the photoconductor drum 2030b is scanned. The direction in which the optical spot moves is the "main scanning direction" on the photoconductor drum 2030b. The direction of rotation of the photoconductor drum 2030b (i.e., direction of rotation R1 illustrated in FIG. 1) is the "sub-scanning direction" on the photoconductor drum 2030b.

Similarly, the light beams passing through the cylindrical lens 2204c and deflected by the polygon mirror 2104 reaches the photoconductor drum 2030c via the scanning lens 2105c and the deflection mirrors 2106c and 2108c, to form an optical spot on the photoconductor drum 2030c. As the polygon mirror 2104 rotates, the optical spot moves in a longitudinal direction of the photoconductor drum 2030c, that is, the axial direction thereof. Thus, the surface of the photoconductor drum 2030c is scanned. The direction in which the optical spot moves is the "main scanning direction" on the photoconductor drum 2030c. The direction of rotation of the photoconductor drum 2030c (i.e., direction of rotation R1 illustrated in FIG. 1) is the "sub-scanning direction" on the photoconductor drum 2030c.

Similarly, the light beams passing through the cylindrical lens 2204d and deflected by the polygon mirror 2104 reaches the photoconductor drum 2030d via the scanning lens 2105d and the deflection mirror 2106d, to form an optical spot on the photoconductor drum 2030d. As the polygon mirror 2104 rotates, the optical spot moves in a longitudinal direction of the photoconductor drum 2030d, that is, the axial direction thereof. Thus, the surface of the photoconductor drum 2030d is scanned. The direction in which the optical spot moves is the "main scanning direction" on the photoconductor drum 2030d. The direction of rotation of the photoconductor drum 2030d (i.e., direction of rotation R1 illustrated in FIG. 1) is the "sub-scanning direction" on the photoconductor drum 2030d.

The deflection mirrors 2106a, 2106b, 2106c, 2106d, 2108b, and 2108c are disposed such that all the optical paths from the polygon mirror 2104 to the photoconductor drums 2030 have identical lengths and that the light beams enter identical positions of the photoconductor drums 2030 at identical angles of incidence.

Optical systems disposed on the optical paths between the polygon mirror 2104 and the respective photoconductor drums 2030 are referred to as scanning optical systems. For example, the scanning optical system for the image forming station K is constructed of, e.g., the scanning lens 2105a and the deflection mirror 2106a. Similarly, the scanning optical system for the image forming station C is constructed of, e.g., the scanning lens 2105b and the deflection mirrors 2106b and 2108b. The scanning optical system for the image forming station M is constructed of, e.g., the scanning lens 2105c and the deflection mirrors 2106c and 2108c. The scanning optical system for the image forming station Y is constructed of, e.g., the scanning lens 2105d and the deflection mirror 2106d. In the present embodiment, each of the scanning optical systems includes a single scanning lens 2105. Alternatively, each of the scanning optical systems may include a plurality of scanning lenses 2105.

Figure 8:
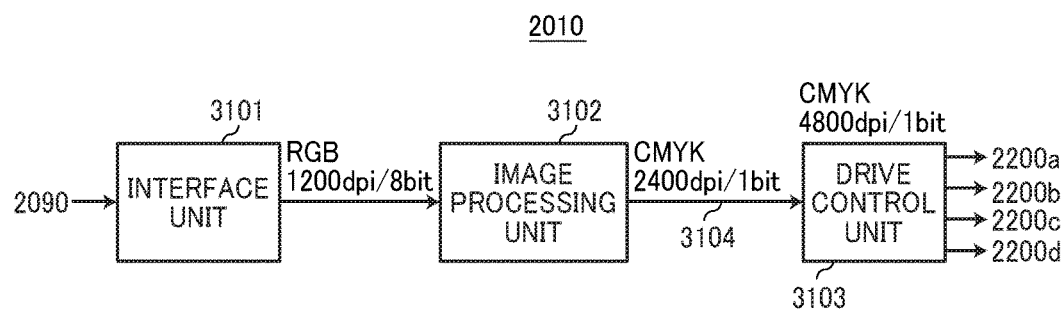
FIG. 8 is a block diagram of an electrical system of the optical scanner.

Referring now to FIG. 8, a description is given of an electrical system of the optical scanner 2010.

FIG. 8 is a block diagram of the electrical system of the optical scanner 2010.

The electrical system of the optical scanner 2010 includes an interface unit 3101, an image processing unit 3102, and a drive control unit 3103 as a drive control device.

The interface unit 3101 acquires image data, transmitted by the upstream device 100 (e.g., computer), from the printer controller 2090. Then, the interface unit 3101 transmits the image data thus acquired to the image processing unit 3102 that follows the interface unit 3101.

In the present example, the interface unit 3101 acquires 8-bit image data in red, green, and blue (RGB) format, having a resolution of 1200 dots per inch (dpi). The interface unit 3101 transmits the image data thus acquired to the image processing unit 3102.

The image processing unit 3102 functions as an image processor. The image processing unit 3102 acquires the image data from the interface unit 3101, and converts the image data into color image data appropriate for the printing system employed. For example, the image processing unit 3102 converts the image data in the RGB format (hereinafter simply referred to as RGB image data) into image data for a tandem system, that is, image data in cyan, magenta, yellow, and black format (hereinafter simply referred to as CMYK image data). In addition to data format conversion, the image processing unit 3102 performs various kinds of image processing.

In the present example, the image processing unit 3102 outputs 1-bit, CMYK image data having a resolution of 2400 dpi. It is to be noted that the resolution of the image data outputted by the image processing unit 3102 is not limited to 2400 dpi. The resolution of the image data outputted by the image processing unit 3102 is herein referred to as a first resolution.

The image processing unit 3102 also generates tag information. The tag information indicates whether each of pixels in the image data having the first resolution (i.e., 2400 dpi) is a pixel forming text or a line. The tag information is also regarded as information that indicates whether each of the pixels in the image data is an area in which a specific object is drawn. In the present example, the specific object is any one of text, a line, and a graphical shape. In the present example, each of the pixels constructing the image data outputted by the image processing unit 3102 includes a first pixel value and a second pixel value. The first pixel value indicates image information. The second pixel value indicates the tag information. In other words, the second pixel value indicates whether each of the pixels constructing the image data is an area in which the specific object is drawn. Hereinafter, the image data outputted by the image processing unit 3102 is referred to as first image data. The image processing unit 3102 transmits the first image data thus generated to the drive control unit 3103.

The drive control unit 3103 acquires the first image data from the image processing unit 3102, and converts the first image data into color image data having a second resolution, which may be hereinafter referred to as second image data, appropriate to drive the light sources 2200. It is to be noted that the second resolution is higher than the first resolution. In the present example, the drive control unit 3103 converts the first image data into 1-bit, CMYK image data having a resolution of 4800 dpi.

The drive control unit 3103 modulates the image data having the second resolution to a clock signal that indicates when a pixel emits light, thereby generating an independent modulation signal for each color. The drive control unit 3103 drives each of the light sources 2200a, 2200b, 2200c, and 2200d to emit light according to the modulation signal for each color. It is to be noted that the drive control unit 3103 may perform resolution conversion and modulation processing integrally.

The drive control unit 3103 is, e.g., a single, integrated device as one chip disposed adjacent to the light sources 2200*a*, 2200*b*, 2200*c*, and 2200*d*. The image processing unit 3102 and the interface unit 3101 are disposed farther from the light sources 2200*a*, 2200*b*, 2200*c*, and 2200*d* than the drive control unit 3103 is. A cable 3104 couples the image processing unit 3102 to the drive control unit 3103.

In the optical scanner 2010 configured as described above, the light sources 2200*a*, 2200*b*, 2200*c*, and 2200*d* emit light to form latent images on the surface of the respective photoconductor drums 2030*a*, 2030*b*, 2030*c*, and 2030*d* according to the respective image data.

Figure 9:
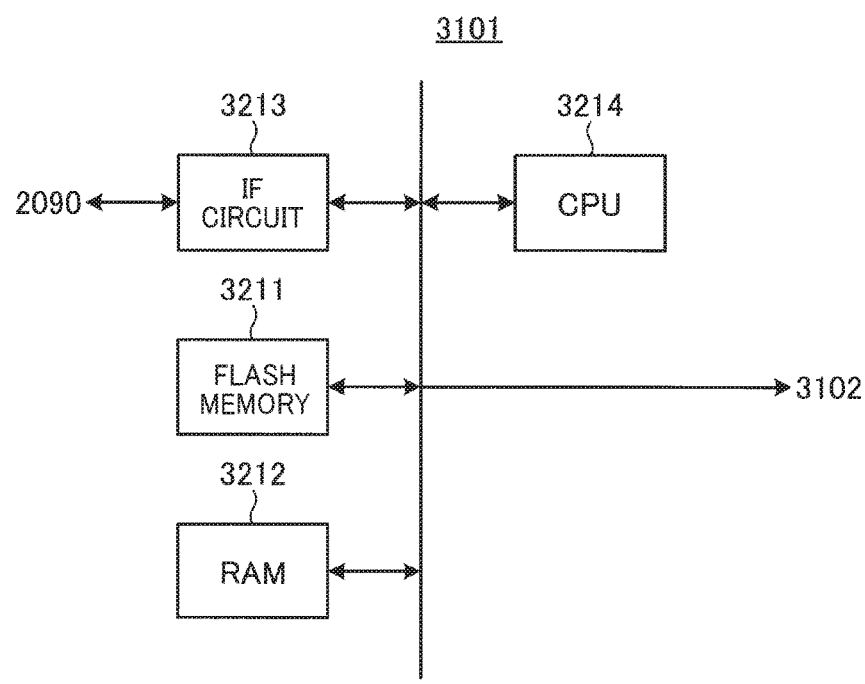
FIG. 9 is a block diagram of an interface unit incorporated in the optical scanner of FIG. 8.

Referring now to FIG. 9, a description is given of a structure of the interface unit 3101.

FIG. 9 is a block diagram of the interface unit 3101.

The interface unit 3101 includes, e.g., a flash memory 3211, a random access memory (RAM) 3212, an interface (IF) circuit 3213, and a central processing unit (CPU) 3214. A bus couples the flash memory 3211, the RAM 3212, the IF circuit 3213, and the CPU 3214 to each other.

The flash memory 3211 holds a program that is executed by the CPU 3214 and various kinds of data used for execution of the program by the CPU 3214. The RAM 3212 is a working, storage area for the CPU 3214 to execute the program. The IF circuit 3213 performs bidirectional communication with the printer controller 2090.

The CPU 3214 operates in accordance with the program stored in the flash memory 3211 to control the entire optical scanner 2010. The interface unit 3101 configured as described above receives the image data, in the present example, 8-bit, RGB image data having a resolution of 1200 dpi, from the printer controller 2090. It is to be noted that the image data thus transmitted and inputted by the printer controller 2090 is herein referred to as input image data. Then, the interface unit 3101 transmits the input image data to the image processing unit 3102.

Figure 10:
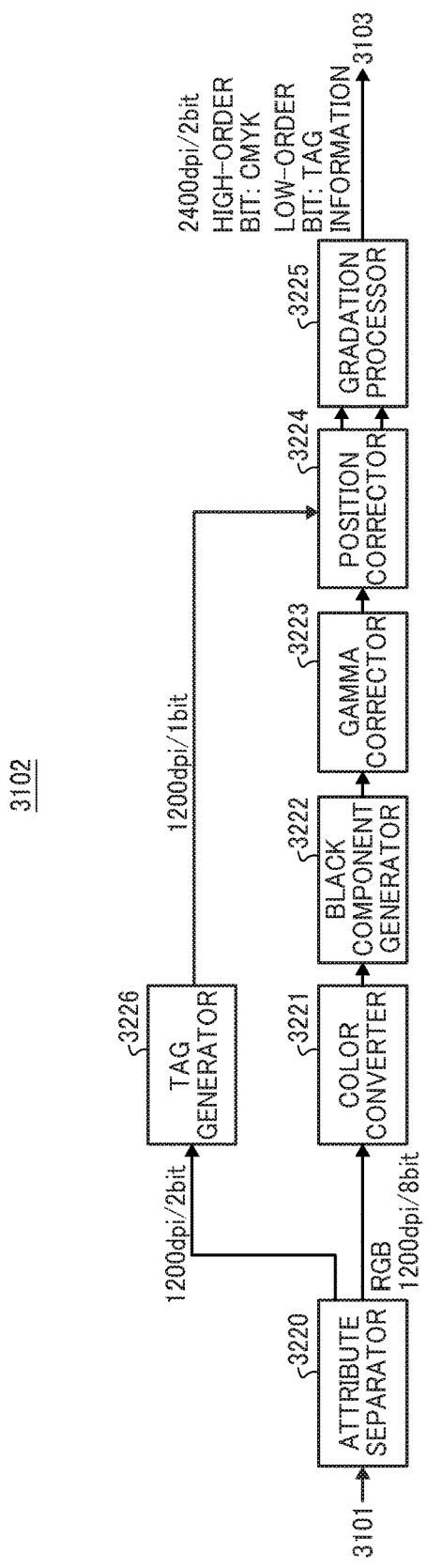
FIG. 10 is a block diagram of an image processing unit incorporated in the optical scanner of FIG. 8.

Referring now to FIG. 10, a description is given of a structure of the image processing unit 3102.

FIG. 10 is a block diagram of the image processing unit 3102.

The image processing unit 3102 includes an attribute separator 3220, a color converter 3221, a black component generator 3222, a gamma corrector 3223, and a position corrector 3224, a gradation processor 3225, and a tag generator 3226.

The attribute separator 3220 receives the input image data (i.e., 8-bit, RGB image data having a resolution of 1200 dpi) from the interface unit 3101. Attribute information or attribute data is added to each pixel of the input image data. The attribute information indicates a type of an object as a source of the area (i.e., pixel). For example, if the pixel is a part of text, the attribute information indicates an attribute of "text". Alternatively, if the pixel is a part of a line, the attribute information indicates an attribute of "line". Alternatively, if the pixel is a part of a graphical shape, the attribute information indicates an attribute of "graphical shape". Alternatively, if the pixel is a part of a photograph, the attribute information indicates an attribute of "photograph".

The attribute separator 3220 separates the attribute information and image data from the input image data. Then, the attribute separator 3220 transmits the attribute information and the image data thus separated to the tag generator 3226. Meanwhile, the attribute separator 3220 transmits the image data to the color converter 3221. The image data outputted by the attribute separator 3220 is, e.g., 8-bit, RGB image data having a resolution of 1200 dpi. On the other hand, the attribute data outputted by the attribute separator 3220 is, e.g., 2-bit data having a resolution of 1200 dpi, which is identical to the resolution of the image data.

The color converter 3221 converts the 8-bit, RGB image data into 8-bit, CMY image data. Thus, the color converter 3221 generates the 8-bit, CMY image data. Then, the color converter 3221 transmits the 8-bit, CMY image data to the black component generator 3222. The black component generator 3222 generates a black component from the CMY image data thus generated and transmitted by the color converter 3221, thereby generating the CMYK image data. Then, the black component generator 3222 transmits the CMYK image data to the gamma corrector 3223. The gamma corrector 3223 linearly transforms levels of the respective colors of the CMYK image data thus generated and transmitted by the black component generator 3222, by use of a table or the like. Then, the gamma corrector 3223 transmits the image data thus transformed to the position corrector 3224.

The position corrector 3224 removes noise or distortion from the image data received from the gamma corrector 3223. In addition, the position corrector 3224 magnifies or shifts the image data, for example, to correct a position of an image. At this time, the position corrector 3224 converts the image data having a resolution of 1200 dpi into image data having a resolution of 2400 dpi. Then, the position corrector 3224 outputs the CMYK image data having a resolution of 2400 dpi (i.e., first resolution) in which one pixel is represented by a plurality of bits, which is, in the present example, 8 bits.

The gradation processor 3225 receives the 8-bit, CMYK image data having a resolution of 2400 dpi from the position corrector 3224. The gradation processor 3225 performs digital halftoning, such as dithering or error diffusion processing, thereby generating 1-bit area modulation data from the 8-bit image data.

The tag generator 3226 generates the tag information, which indicates whether each of the pixels constructing the image data having a resolution of 1200 dpi inputted from the attribute separator 3220 is a pixel forming text, a line, or a graphical shape. In other words, as described above, the tag information indicates whether each of the pixels constructing the image data is an area in which a specific object is drawn. For example, the tag generator 3226 uses the attribute information to set an area in which a specific object (any one of text, a line, and a graphical shape) is drawn. Then, the tag generator 3226 assigns the tag information to each of pixels included in the area thus set, to indicate that each of the pixels is text, a line, or a graphical shape. In the present example, the tag information is represented by 1 bit. "1" represents tag information indicating that a pixel forms text, a line, or a graphical shape. By contrast, "0" represents tag information indicating that a pixel does not form text, a line, or a graphical shape. Alternatively, however, "0" may represent the tag information indicating that a pixel forms text, a line, or a graphical shape. By contrast, "1" may represent the tag information indicating that a pixel does not form text, a line, or a graphical shape. For example, if a specific object is drawn by dots, the tag information represented by "1" is assigned to each of black and white pixels constructing the specific object.

In the present example, the tag generator 3226 assigns the tag information indicating that a pixel forms text, a line, or a graphical shape to black and white pixels accompanied with the attribute information indicating an attribute of text, a line, or a graphical shape. It is to be noted that the black pixel is a pixel of which a pixel value is 1 when the number of gradations is reduced to 1 bit. According to data of the black pixel, the light source 2200 emits light to the photoconductor drum 2030. By contrast, the white pixel is a pixel of which a pixel value is 0 when the number of gradations is reduced to 1 bit. According to data of the white pixel, the light source 2200 does not emit light to the photoconductor drum 2030.

Now, a description is given of an area to which the tag information indicating that a pixel forms text, a line, or a graphical shape is assigned. The area is hereinafter referred to as a target area.

In the present embodiment, text, a line, or a graphical shape is thinned as edge enhancement. In other words, line thinning is performed on the text, the line, or the graphical shape. Therefore, the tag information represented by "1" (hereinafter simply referred to as tag information 1) is assigned to an area in which text, a line, or a graphical shape is drawn. That is, the tag information represented by "0" (hereinafter simply referred to as tag information 0) is assigned to a background area. In other words, the tag information indicating that a pixel forms text, a line, or a graphical shape is not assigned to the background area. It is to be noted that the text includes a black text and a white text (or outlined text). Similarly, the line includes a black line and a while line (or outlined line). The graphical shape includes a black graphical shape and a while graphical shape (or outlined graphical shape). For example, as illustrated in FIG. 11, when a specific object (text, a line, or a graphical shape) is drawn by dots, the tag information 1 is assigned to each of the black and white pixels constructing the specific object.

Referring back to FIG. 10, the tag generator 3226 generates and transmits the tag information to the drive control unit 3103 via the position corrector 3224 and the gradation processor 3225. As described above, the position corrector 3224 converts the image data having a resolution of 1200 dpi into the image data having a higher resolution of, in this case, 2400 dpi. In addition, the position corrector 3224 corrects the position of the image data. The position corrector 3224 performs the same processing (resolution conversion and position correction) on the tag information. Since the position corrector 3224 converts the tag information having a resolution of 1200 dpi into tag information having a resolution of 2400 dpi, the tag information can be assigned to each pixel in the image data having a resolution of 2400 dpi.

The gradation processor 3225 transmits the 1-bit image information (i.e., area modulation data) having the first resolution (i.e., 2400 dpi) and 1-bit tag information having the first resolution (i.e., 2400 dpi) to the drive control unit 3103. In the present embodiment, the gradation processor 3225 transmits the image information and the tag information through a single path. Specifically, the gradation processor 3225 transmits 2-bit data having the first resolution (i.e., 2400 dpi) to the drive control unit 3103. A high-order bit of the 2-bit data represents the image information (i.e., CMYK) while a low-order bit of the 2-bit data represents the tag information.

Thus, the image processing unit 3102 generates and transmits the image data (i.e., first image data) having the first resolution (i.e., 2400 dpi) to the drive control unit 3103. As described above, the first image data includes a plurality of pixels. Each of the plurality of pixels includes the first pixel value indicating the image information and the second pixel value indicating the tag information. In the present example, each of first pixel value and the second pixel value is represented by 1 bit.

Referring now to FIGS. 12A through 12D, a description is given of some examples of the pixels included in the first image data.

FIG. 12A illustrates a while pixel in the background of the first image data, as a first example. The tag information 0 is assigned to the white pixel. FIG. 12B illustrates a black pixel in the background of the first image data, as a second example. The tag information 0 is assigned to the black pixel. FIG. 12C illustrates a white pixel of text, a line, or a graphical shape, as a third example. The tag information 1 is assigned to the white pixel. FIG. 12D illustrates a black pixel of the text, the line, or the graphical shape, as a fourth example. The tag information 1 is assigned to the black pixel.

The image processing unit 3102 may be implemented partly or entirely by hardware, or may be implemented by the CPU executing a software program.

Figure 13:
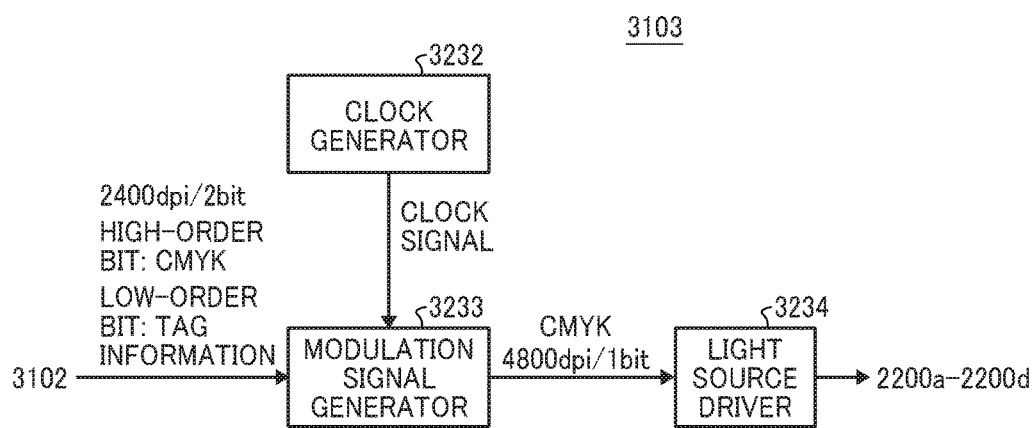
FIG. 13 is a block diagram of a drive control unit incorporated in the optical scanner of FIG. 8.

Referring now to FIG. 13, a description is given of a structure of the drive control unit 3103.

FIG. 13 is a block diagram of the drive control unit 3103.

The drive control unit 3103 includes a clock generator 3232, a modulation signal generator 3233, and a light source driver 3234.

The clock generator 3232 generates a clock signal indicating when a pixel emits light. The clock signal is a signal that allows image data to be modulated with a resolution corresponding to 4800 dpi.

The modulation signal generator 3233 acquires the first image data from the image processing unit 3102. According to the first image data, the modulation signal generator 3233 generates image data having the second resolution higher than the first resolution. In the present example, the modulation signal generator 3233 generates image data equivalent to 1-bit, CMYK image data having a resolution of 4800 dpi, based on 1-bit, CMYK image information and 1-bit tag information each having a resolution of 2400 dpi. Then, the modulation signal generator 3233 modulates the image data having the second resolution to the clock signal, thereby generating a modulation signal to form an image having a resolution of 4800 dpi. The modulation signal is an independent modulation signal for each color.

The light source driver 3234 receives the modulation signal corresponding to the image data having the second resolution from the modulation signal generator 3233. The light source driver 3234 drives each of the light sources 2200a, 2200b, 2200c, and 2200d according to the corresponding modulation signal (i.e., independent modulation signal for each color) generated and outputted by the modulation signal generator 3233. Accordingly, the light source driver 3234 allows each of the light sources 2200a, 2200b, 2200c, and 2200d to perform exposure according to the corresponding modulation signal.

Figure 14:
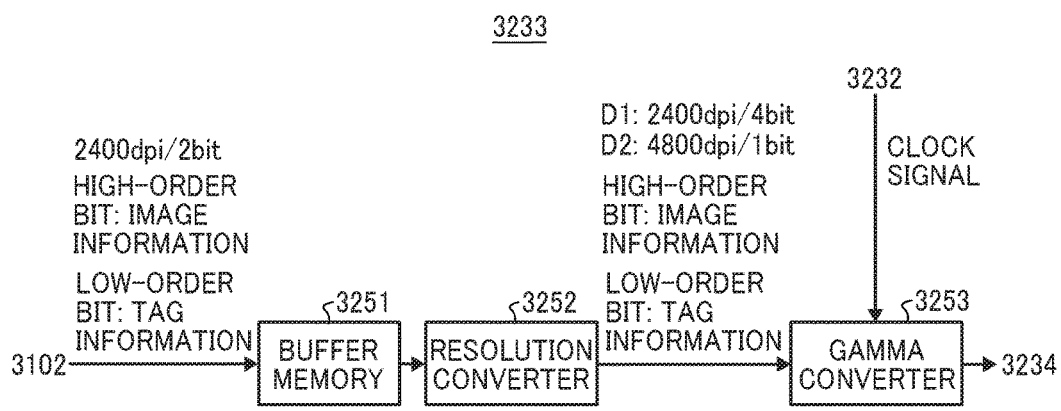
FIG. 14 is a block diagram of a modulation signal generator incorporated in the drive control unit of FIG. 13.

Referring now to FIG. 14, a description is given of a structure of the modulation signal generator 3233.

FIG. 14 is a block diagram of the modulation signal generator 3233.

The modulation signal generator 3233 includes a buffer memory 3251, a resolution converter 3252, and a gamma converter 3253.

The buffer memory 3251 accumulates the 2-bit data of the first image data having the first resolution (i.e., 2400 dpi) transmitted by the image processing unit 3102. The 2-bit data includes the high-order bit representing the image information (i.e., CMYK) and the low-order bit representing the tag information. In the present example, the buffer memory 3251 stores data corresponding to a plurality of main scanning lines, that is, a plurality of sets of the image information and the tag information, of the first image data. It is to be noted that, if the image data is multi-tone data, the image data may be represented by two or more bits. The number of bits representing the tag information can be changed as appropriate. In response to retrieval from the resolution converter 3252 that follows the buffer memory 3251, the buffer memory 3251 transmits the pixels constructing the first image data thus accumulated to the resolution converter 3252.

The resolution converter 3252 converts the first image data accumulated and transmitted by the buffer memory 3251 into the image data having the second resolution (equivalent to 1-bit image data having a resolution of 4800 dpi) higher than the first resolution. Each pixel of the image data thus converted includes the image information and the tag information. In the present embodiment, the image data thus converted by the resolution converter 3252 is 4-bit data having a resolution of 2400 dpi in the main scanning direction and 1-bit data having a resolution of 4800 dpi in the sub-scanning direction. A high-order bit of the 4-bit data represents the image information (i.e., CMYK) and a low-order bit of the 4-bit data represents the tag information. In FIG. 14, D1 represents the main scanning direction while D2 represents the sub-scanning direction.

The resolution converter 3252 subsequently selects target pixels from the first image data to execute the resolution conversion for each target pixel. The resolution converter 3252 transmits the image data having the second resolution thus converted to the gamma converter 3253.

The gamma converter 3253 receives the image data having the second resolution from the resolution converter 3252. Then, the gamma converter 3253 modulates the image data thus received to the clock signal, and converts the level of the image data to a level appropriate for characteristics of the light source 2200, thereby generating the modulation signal. Then, the gamma converter 3253 transmits the modulation signal thus generated to the light source driver 3234. In the present example, the gamma converter 3253 functions as a generator.

Figure 15:
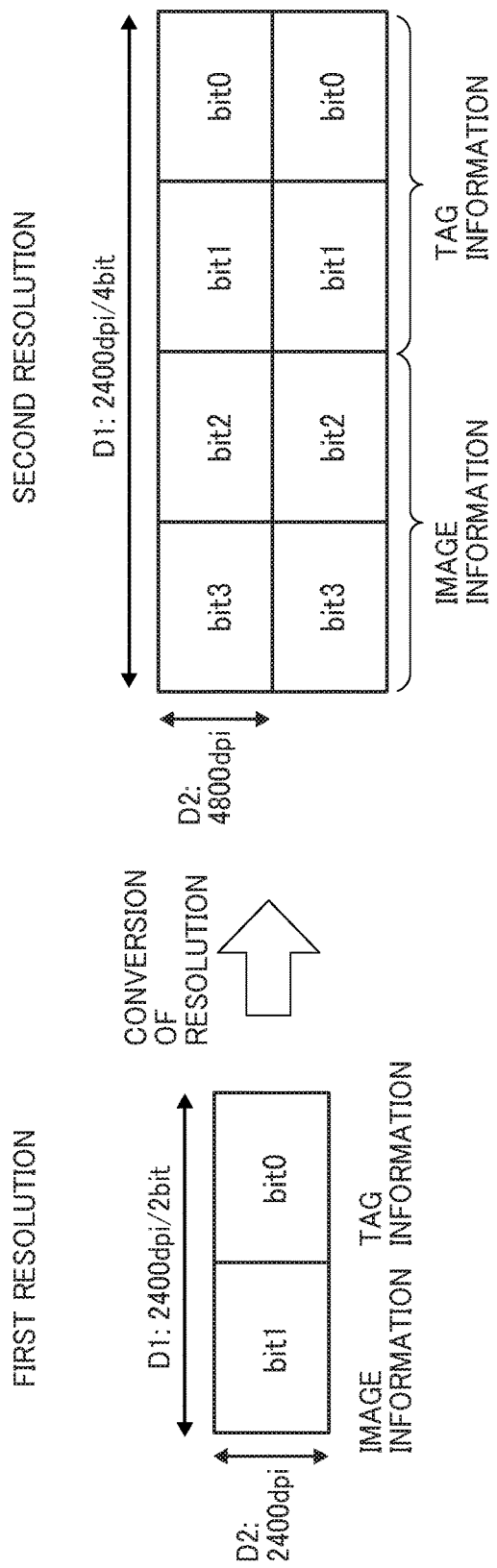
FIG. 15 is a diagram of the resolution conversion executed by a resolution converter incorporated in the modulation signal generator of FIG. 14, illustrating relative positions of bits representing image information and tag information in a first resolution before the resolution is converted, and relative positions of bits representing the image information and the tag information in a second resolution after the resolution is converted.

FIG. 15 is a diagram of the resolution conversion executed by the resolution converter 3252, illustrating relative positions of bits representing image information and tag information in the first resolution (i.e., 2400 dpi), that is, before the resolution is converted, and relative positions of bits representing the image information and the tag information in a second resolution in the second resolution (i.e., 4800 dpi), that is, after the resolution is converted.

In the present embodiment, the data having the first resolution is represented by 2 bits with a resolution of 2400 dpi in the main scanning direction D1 and by 1 bit with a resolution of 2400 dpi in the sub-scanning direction D2. The 2-bit data in the main scanning direction D1 includes the high-order bit (bit 1) representing the image information (i.e., CMYK) and the low-order bit (bit 0) representing the tag information.

On the other hand, in the present embodiment, the data having the second resolution is represented by 4 bits with a resolution of 2400 dpi in the main scanning direction D1 and by 1 bit with a resolution of 4800 dpi in the sub-scanning direction D2. The 4-bit data in the main scanning direction D1 includes the high-order bits (bit 3 and bit 2) representing the image information (i.e., CMYK) and the low-order bits (bit 1 and bit 0) representing the tag information. It is to be noted that the data having the second resolution is data having a resolution of 2400 dpi in the main scanning direction D1. Since the number of bits in the main scanning direction D1 of the data having the second resolution is twice the number of bits in the main scanning direction D1 of the data having the first resolution, the data having the second resolution corresponds to 2-bit data having a resolution of 4800 dpi.

Figure 16:
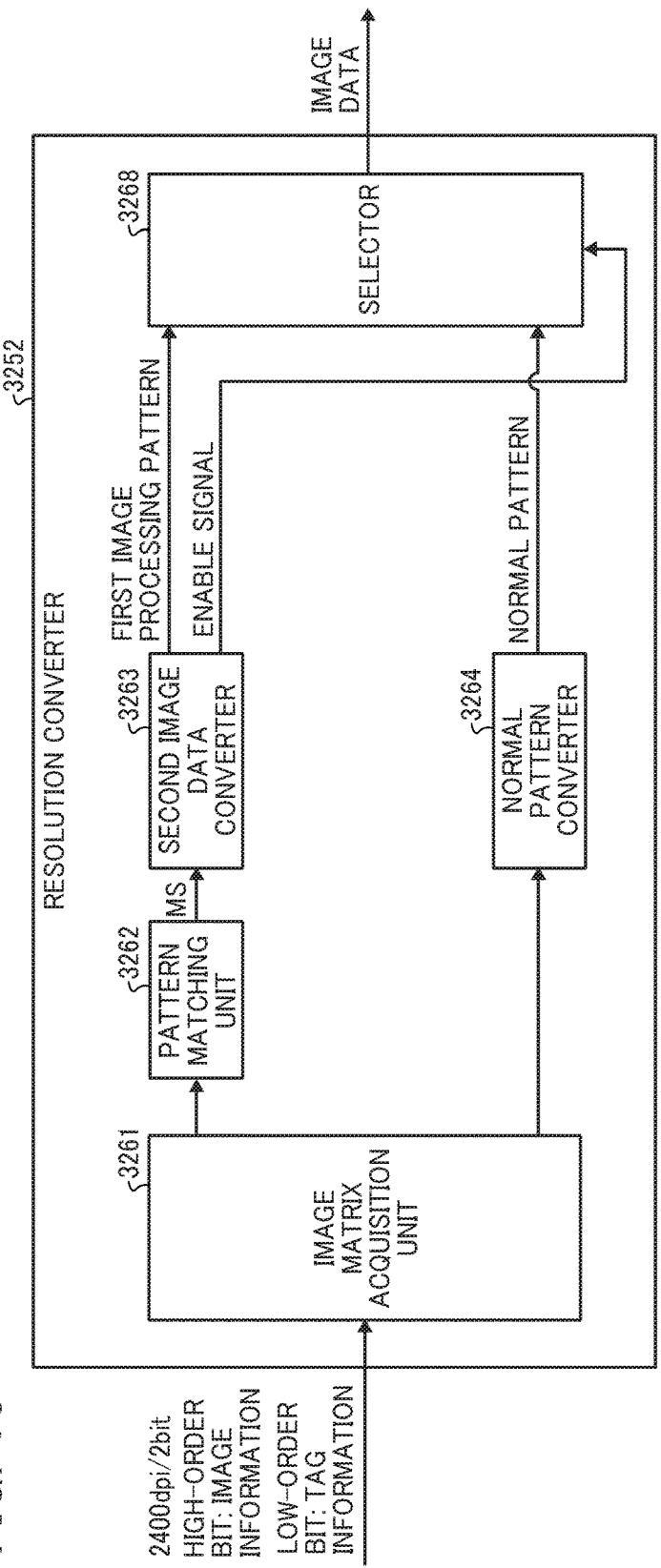
FIG. 16 is a block diagram of the resolution converter.

Referring now to FIG. 16, a description is given of a structure of the resolution converter 3252.

FIG. 16 is a block diagram of the resolution converter 3252.

In the present embodiment, the resolution converter 3252 subsequently selects the target pixels from the first image data one by one to execute the processing to convert the resolution (i.e., resolution conversion as illustrated in FIG. 15) for each target pixel.

As illustrated in FIG. 16, the resolution converter 3252 includes, e.g., an image matrix acquisition unit 3261, a pattern matching unit 3262, a second image data converter 3263, a normal pattern converter 3264, and a selector 3268. These functions are implemented by a hardware circuit (e.g., semiconductor integrated circuit).

Figure 17:
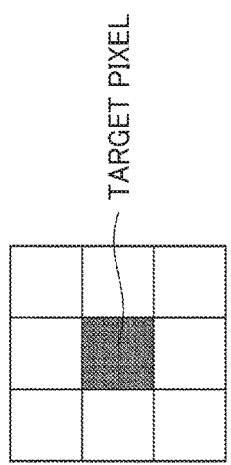
FIG. 17 is a diagram of a first example of an image matrix.

The image matrix acquisition unit 3261 is an example of an "acquisition unit". The image matrix acquisition unit 3261, as an acquisition unit, acquires an image matrix corresponding to an area including a target pixel and pixels surrounding the target pixel from the first image data. In the present embodiment, the image matrix acquisition unit 3261 acquires the image matrix corresponding to an area including a target pixel and pixels surrounding the target pixel from the buffer memory 3251. The image matrix is the image information and also the tag information of the area including a target pixel and pixels surrounding the target pixel within the first image data. For example, the image matrix is the image information and also the tag information of a rectangle area centering a target pixel within the first image data. In the present embodiment, the image matrix is the image information and also the tag information of an area constructed of 3×3 pixels centering a target pixel within the first image data. In other words, the image matrix is a partial image of the first image data. The partial image, having the first resolution, is the area constructed of 3×3 pixels centering a target pixel within the first image data. Each of the pixels constructing the image matrix is represented by 2-bit information that includes the first pixel value indicating the image information and the second pixel value indicating the tag information. The size of the image matrix is determined based on the size of a detection pattern that is used for pattern matching performed by the pattern matching unit 3262, described later. In the present embodiment, as illustrated in FIG. 17, the image matrix is a pattern of pixels aligned in a 3×3 matrix.

The pattern matching unit 3262 performs pattern matching to determine whether one or more detection patterns match the image matrix acquired by the image matrix acquisition unit 3261. Each of the one or more detection patterns includes a plurality of pixels. Each of the plurality of pixels includes the first pixel value indicating the image information and the second pixel value indicating the tag information. Each of the one or more detection patterns is a pattern to detect a pixel forming an edge portion in which each of the first pixel value and the second pixel value varies between pixels.

For example, the pattern matching unit 3262 determines that the target pixel forms the edge portion between a specific object (i.e., line, text, or graphical shape) and a background, if the location of the image information and the tag information within the image matrix matches any of a plurality of detection patterns registered in advance. If not, the pattern matching unit 3262 determines that the target pixel does not form the edge portion between the specific object and the background.

Figures 18A, 18B, 18C:
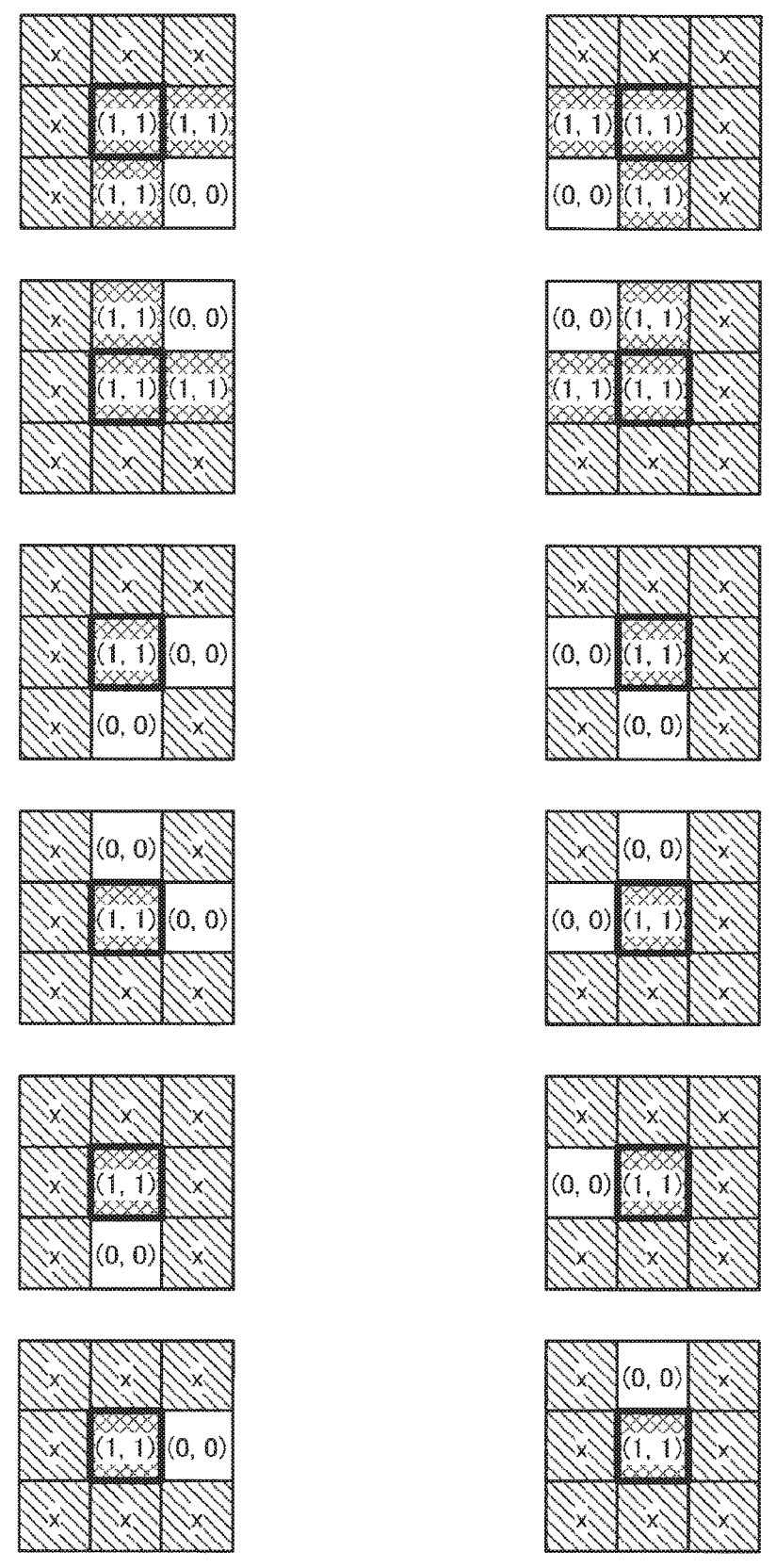

Referring now to FIGS. 18A through 18C, a description is given of some examples of the detection pattern as a first type of detection pattern.

FIG. 18A is a diagram of a first example of the detection pattern. FIG. 18B is a second example of the detection pattern. FIG. 18C is a diagram of a third example of the detection pattern.

Such examples of the detection pattern as illustrated in FIGS. 18A through 18C are used to detect a pixel forming an edge portion that is a boundary between a black pixel of text, a line, or a graphical shape and a white pixel of a background. In the edge portion, each of the first pixel value and the second pixel value varies between pixels, from one of "0" and "1" to the other. FIGS. 18A and 18B illustrate examples of the detection pattern to detect a pixel forming a corner of the specific object (i.e., line, text, or graphical shape). FIG. 18C illustrates examples of the detection pattern to detect a pixel forming an edge portion of the specific object (i.e., line, text, or graphical shape), that is, a boundary between the specific object and the background. In FIGS. 18A through 18C, a pixel corresponding to the target pixel is a black pixel located in the center of the matrix in each example of the detection pattern. As illustrated in FIGS. 18A through 18C, the tag information 1 is assigned to the black pixel corresponding to the target pixel.

Referring back to FIG. 16, if the pattern matching unit 3262 determines that the target pixel forms the edge portion (i.e., boundary) between the specific object and the background, the pattern matching unit 3262 transmits a matching signal MS to the second image data converter 3263 to identify the location of the image information and the tag information within the image matrix. By contrast, if the pattern matching unit 3262 determines that the target pixel does not form the edge portion between the specific object and the background, the pattern matching unit 3262 does not transmit the matching signal MS to the second image data converter 3263.

If the image matrix matches any of the one or more detection patterns, the second image data converter 3263 performs the edge enhancement on the target pixel and the resolution conversion to convert the first resolution into the second resolution higher than the first resolution, to convert the target pixel into the second image data (hereinafter referred to as a first image processing pattern). The edge enhancement is herein line thinning. The second image data converter 3263 performs image processing associated with the one or more detection patterns that match the image matrix, with reference to image processing information in which image processing corresponding to the line thinning and the resolution conversion is associated with each of the one or more detection patterns. In the present example, if the second image data converter 3263 receives the matching signal MS from the pattern matching unit 3262, the second image data converter 3263 performs image processing associated with the detection pattern corresponding to the location of the image information and the tag information indicated by the matching signal MS thus received.

After performing the image processing associated with the detection pattern that matches the image matrix, the second image data converter 3263 outputs the first image processing pattern acquired by the image processing to the selector 3268 together with an enable signal. Alternatively, for example, the pattern matching unit 3262 may output the enable signal to the selector 3268 after determining that the image matrix matches any of the one or more detection patterns. In short, the selector 3268 receives the enable signal after the second image data converter 3263 performs conversion.

Figure 19A:
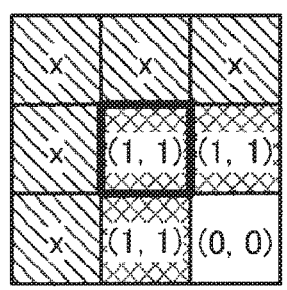
FIG. 19A is a diagram of a detection pattern corresponding to an upper-left detection pattern of FIG. 18A.
Figure 19B:
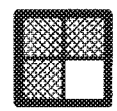
FIG. 19B is a target pixel converted as a result of image processing associated with the detection pattern of FIG. 19A.
Figure 20A:
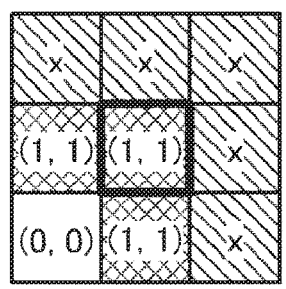
FIG. 20A is a diagram of a detection pattern corresponding to an upper-right detection pattern of FIG. 18A.
Figure 20B:
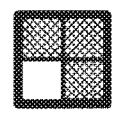
FIG. 20B is a target pixel converted as a result of image processing associated with the detection pattern of FIG. 20A.
Figure 21A:
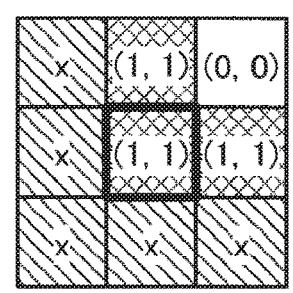
FIG. 21A is a diagram of a detection pattern corresponding to a lower-left detection pattern of FIG. 18A.
Figure 21B:
FIG. 21B is a target pixel converted as a result of image processing associated with the detection pattern of FIG. 21A.
Figure 22A:
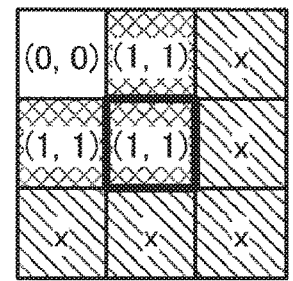
FIG. 22A is a diagram of a detection pattern corresponding to a lower-right detection pattern of FIG. 18A.
Figure 22B:
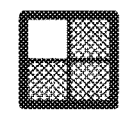
FIG. 22B is a target pixel converted as a result of image processing associated with the detection pattern of FIG. 22A.

For example, if the image matrix matches a detection pattern illustrated in FIG. 19A corresponding to an upper-left detection pattern of FIG. 18A, and if the second image data converter 3263 performs image processing associated with the detection pattern of FIG. 19A, the target pixel included in the image matrix is converted into the target pixel illustrated in FIG. 19B. FIGS. 20A through 30B are diagrams similar to the diagrams of FIGS. 19A and 19B. Specifically, FIG. 20A illustrates a detection pattern corresponding to an upper-right detection pattern of FIG. 18A. If the second image data converter 3263 performs image processing associated with the detection pattern of FIG. 20A, the target pixel included in the image matrix is converted into the target pixel illustrated in FIG. 20B. FIG. 21A illustrates a detection pattern corresponding to a lower-left detection pattern of FIG. 18A. If the second image data converter 3263 performs image processing associated with the detection pattern of FIG. 21A, the target pixel included in the image matrix is converted into the target pixel illustrated in FIG. 21B. FIG. 22A illustrates a detection pattern corresponding to a lower-right detection pattern of FIG. 18A. If the second image data converter 3263 performs image processing associated with the detection pattern of FIG. 22A, the target pixel included in the image matrix is converted into the target pixel illustrated in FIG. 22B.

Figure 23A:
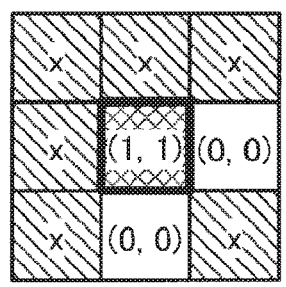
FIG. 23A is a diagram of a detection pattern corresponding to an upper-left detection pattern of FIG. 18B.
Figure 23B:
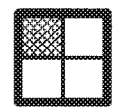
FIG. 23B is a target pixel converted as a result of image processing associated with the detection pattern of FIG. 23A.
Figure 24A:
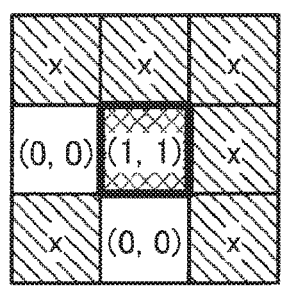
FIG. 24A is a diagram of a detection pattern corresponding to an upper-right detection pattern of FIG. 18B.
Figure 24B:
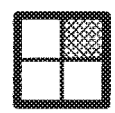
FIG. 24B is a target pixel converted as a result of image processing associated with the detection pattern of FIG. 24A.
Figure 25A:
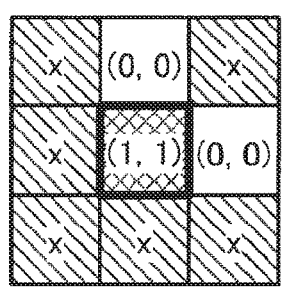
FIG. 25A is a diagram of a detection pattern corresponding to a lower-left detection pattern of FIG. 18B.
Figure 25B:
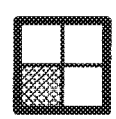
FIG. 25B is a target pixel converted as a result of image processing associated with the detection pattern of FIG. 25A.
Figure 26A:
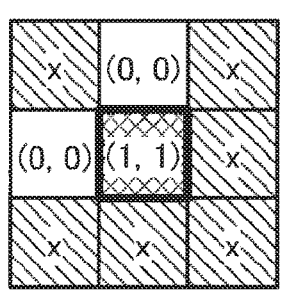
FIG. 26A is a diagram of a detection pattern corresponding to a lower-right detection pattern of FIG. 18B.
Figure 26B:
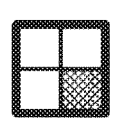
FIG. 26B is a target pixel converted as a result of image processing associated with the detection pattern of FIG. 26A.

FIG. 23A illustrates a detection pattern corresponding to an upper-left detection pattern of FIG. 18B. If the second image data converter 3263 performs image processing associated with the detection pattern of FIG. 23A, the target pixel included in the image matrix is converted into the target pixel illustrated in FIG. 23B. FIG. 24A illustrates a detection pattern corresponding to an upper-right detection pattern of FIG. 18B. If the second image data converter 3263 performs image processing associated with the detection pattern of FIG. 24A, the target pixel included in the image matrix is converted into the target pixel illustrated in FIG. 24B. FIG. 25A illustrates a detection pattern corresponding to a lower-left detection pattern of FIG. 18B. If the second image data converter 3263 performs image processing associated with the detection pattern of FIG. 25A, the target pixel included in the image matrix is converted into the target pixel illustrated in FIG. 25B. FIG. 26A illustrates a detection pattern corresponding to a lower-right detection pattern of FIG. 18B. If the second image data converter 3263 performs image processing associated with the detection pattern of FIG. 26A, the target pixel included in the image matrix is converted into the target pixel illustrated in FIG. 26B.

Figure 27A:
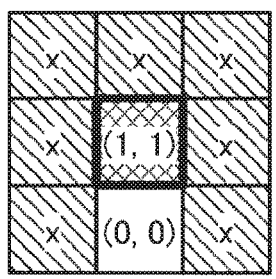
FIG. 27A is a diagram of a detection pattern corresponding to an upper-left detection pattern of FIG. 18C.
Figure 27B:
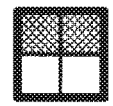
FIG. 27B is a target pixel converted as a result of image processing associated with the detection pattern of FIG. 27A.
Figure 28A:
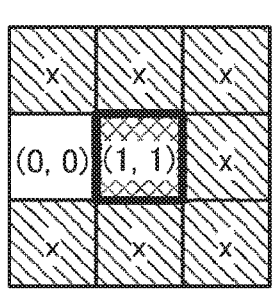
FIG. 28A is a diagram of a detection pattern corresponding to an upper-right detection pattern of FIG. 18C.
Figure 28B:
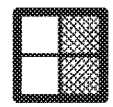
FIG. 28B is a target pixel converted as a result of image processing associated with the detection pattern of FIG. 28A.
Figure 29A:
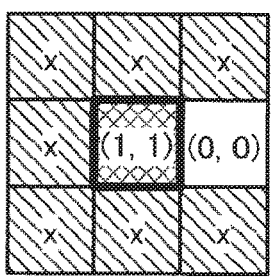
FIG. 29A is a diagram of a detection pattern corresponding to a lower-left detection pattern of FIG. 18C.
Figure 29B:
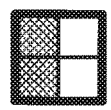
FIG. 29B is a target pixel converted as a result of image processing associated with the detection pattern of FIG. 29A.
Figure 30A:
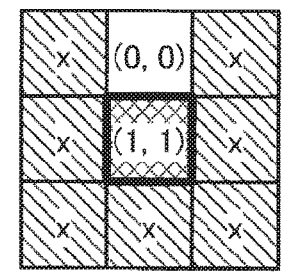
FIG. 30A is a diagram of a detection pattern corresponding to a lower-right detection pattern of FIG. 18C.
Figure 30B:
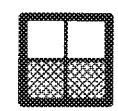
FIG. 30B is a target pixel converted as a result of image processing associated with the detection pattern of FIG. 30A.

FIG. 27A illustrates a detection pattern corresponding to an upper-left detection pattern of FIG. 18C. If the second image data converter 3263 performs image processing associated with the detection pattern of FIG. 27A, the target pixel included in the image matrix is converted into the target pixel illustrated in FIG. 27B. FIG. 28A illustrates a detection pattern corresponding to an upper-right detection pattern of FIG. 18C. If the second image data converter 3263 performs image processing associated with the detection pattern of FIG. 28A, the target pixel included in the image matrix is converted into the target pixel illustrated in FIG. 28B. FIG. 29A illustrates a detection pattern corresponding to a lower-left detection pattern of FIG. 18C. If the second image data converter 3263 performs image processing associated with the detection pattern of FIG. 29A, the target pixel included in the image matrix is converted into the target pixel illustrated in FIG. 29B. FIG. 30A illustrates a detection pattern corresponding to a lower-right detection pattern of FIG. 18C. If the second image data converter 3263 performs image processing associated with the detection pattern of FIG. 30A, the target pixel included in the image matrix is converted into the target pixel illustrated in FIG. 30B.

In the present embodiment, the priority is established in advance between three groups formed by FIGS. 18A through 18C, respectively. For example, the group of FIG. 18A precedes the group of FIG. 18B, and the group of FIG. 18B precedes the group of FIG. 18C. If a plurality of groups includes a detection pattern that matches the image matrix, the second image data converter 3263 may perform image processing associated with the detection pattern belonging to one of the groups taking top priority.

Thus, if the target pixel forms the edge portion (i.e., boundary) between the specific object and the background, the second image data converter 3263 converts the image information and the tag information of the target pixel into the image information and the tag information, each having the second resolution, corresponding to the detection pattern determined corresponding to the location within the image matrix. In the present embodiment, the second image data converter 3263 outputs the data of 4-bit data having a resolution of 2400 dpi in the main scanning direction and 1-bit data having a resolution of 4800 dpi in the sub-scanning direction, as the image information and the tag information each having the second resolution, that is, as the first image processing pattern.

Figure 31A:
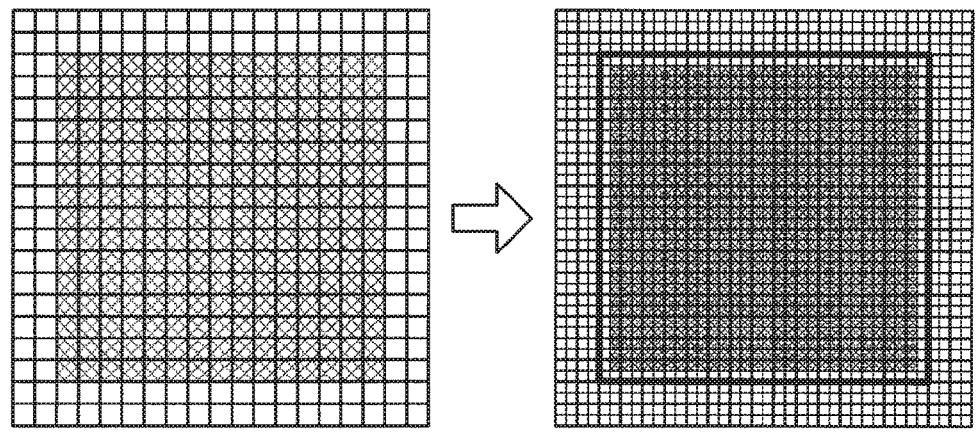
FIG. 31A is a diagram of line thinning and the resolution conversion performed on a simple, quadrangular solid image.
Figure 31B:
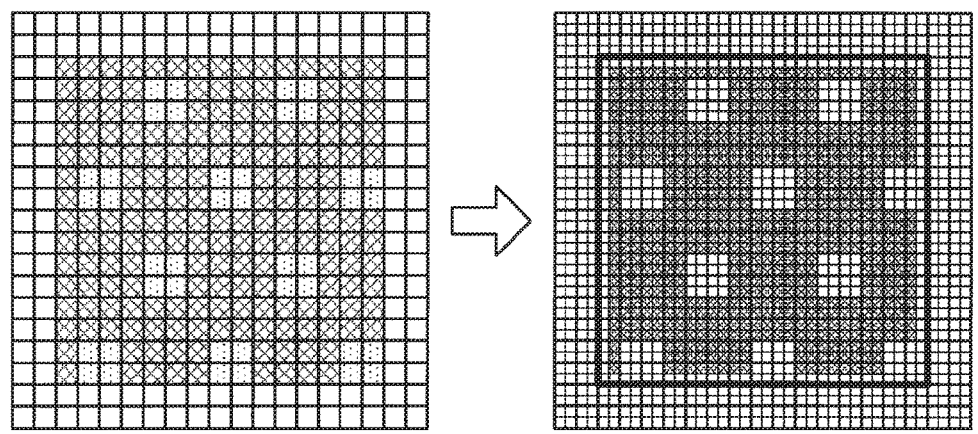
FIG. 31B is a diagram of the line thinning and the resolution conversion performed on a specific object drawn by dots.
Figure 31C:
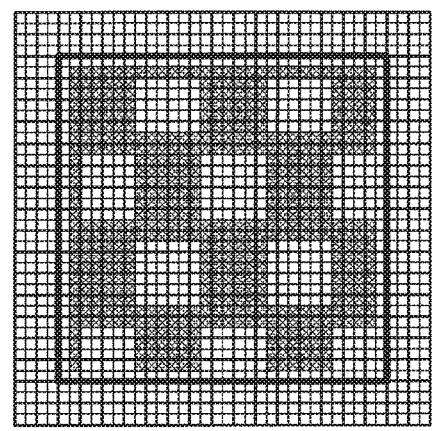
FIG. 31C is a diagram of an image after the line thinning is performed without using a detection pattern.

Referring now to FIGS. 31A through 31C, a description is given of examples of the line thinning and the resolution conversion.

FIG. 31A is a diagram of the line thinning and the resolution conversion performed on a simple, quadrangular solid image.

The left image of FIG. 13A is an image before the line thinning and the resolution conversion is performed. The background is constructed of white pixels to which the tag information 0 is assigned. The tag information 0 indicates that the pixels, in this case, the white pixels, do not construct an area in which the specific object is drawn. By contrast, black pixels to which the tag information 1 is assigned construct a target area that is the area in which the specific object is drawn. The image processing associated with the detection pattern that matches the image matrix is performed as described above. That is, the line thinning and the resolution conversion are performed on a pixel forming the edge portion (i.e., boundary) between the background and the specific object.

FIG. 31B is a diagram of the line thinning and the resolution conversion performed on a specific object drawn by dots.

In the present case, the target area includes black and white pixels. The tag information 1 is assigned to each of the black and white pixels within the target area. The detection pattern that is used for the pattern matching performed by the pattern matching unit 3262 includes a plurality of pixels each including the 1-bit first pixel value indicating the image information and the 1-bit second pixel value indicating the tag information. That is, each of the first pixel value and the second pixel value is represented by 1 bit. The detection pattern is a pattern to detect a pixel forming an edge portion in which each of the first pixel value and the second pixel value varies between pixels. Therefore, the pattern matching unit 3262 does not detect a boundary between a black pixel and a white pixel within the target area. Instead, the pattern matching unit 3262 detects the edge portion (i.e., boundary) between the target area and the background in the pattern matching by use of the detection pattern. Accordingly, the line thinning is performed only on the pixel forming the edge portion (i.e., boundary) between the target area and the background. That is, in the present example, the line thinning is performed only on each of the black pixels to which the tag information 1 is assigned. In other words, the line thinning is not performed on a pixel forming the boundary between a black pixel and a white pixel within the target area. That is, the density of the specific object is not affected.

FIG. 31C is a diagram of an image after the line thinning is performed without using a detection pattern. Before the line thinning is performed, a pixel forming an edge portion (i.e., boundary) between a black pixel and a white pixel is simply detected without using the detection pattern.

Since the line thinning is performed on a pixel within the target area, the density of dots in the image of FIG. 31C is changed, compared to the image of FIG. 31B. That is, the density of the specific object is changed.

Thus, in a typical way of line thinning on text or a line drawn by dots, the line thinning is performed not only on the boundary between the object and the background but also on the boundary between black and white in the object drawn by dots. As a consequence, the image density changes unexpectedly.

Hence, according to the present embodiment, the edge enhancement can be performed without causing unexpected changes in image density.

As described above, in the present embodiment, the pattern matching unit 3262 determines whether one or more detection patterns match the image matrix including a target pixel. Each of the one or more detection patterns includes a plurality of pixels. Each of the plurality of pixels includes the first pixel value indicating the image information and the second pixel value indicating the tag information. In other words, the second pixel value indicates whether each of the plurality of pixels is an area in which the specific object is drawn. Each of the one or more detection patterns is a pattern to detect a pixel forming an edge portion in which each of the first pixel value and the second pixel value varies between pixels. Accordingly, the pixel forming the edge portion (i.e., boundary) between the specific object and the background, can be detected. In the present example, the pixel that can be detected is a black pixel to which the tag information 1 is assigned. The line thinning is performed only on the pixel thus detected. That is, even when a specific object is drawn by dots, for example, a pixel forming an edge portion (i.e., boundary) between a black pixel and a white pixel illustrating the specific object is not detected as an object to be processed. In short, the line thinning is not performed on the pixel forming the edge portion (i.e., boundary) between the black pixel and the white pixel within the specific object. Accordingly, the line thinning (i.e., edge enhancement) can be performed without affecting the density of the specific object. In other words, the edge enhancement can be performed without causing unexpected changes in image density.

The examples of the detection pattern described above as illustrated in FIGS. 18A though 18C are used to detect a pixel forming an edge portion (i.e., boundary) between a black pixel of text, a line, or a graphical shape and a white pixel of the background. Alternatively, examples of the detection pattern as illustrated in FIGS. 32A through 32C may be used to detect a pixel forming an edge portion (i.e., boundary) between a white pixel of text, a line, or a graphical shape and a black pixel of the background.

Figures 32A, 32B, 32C:
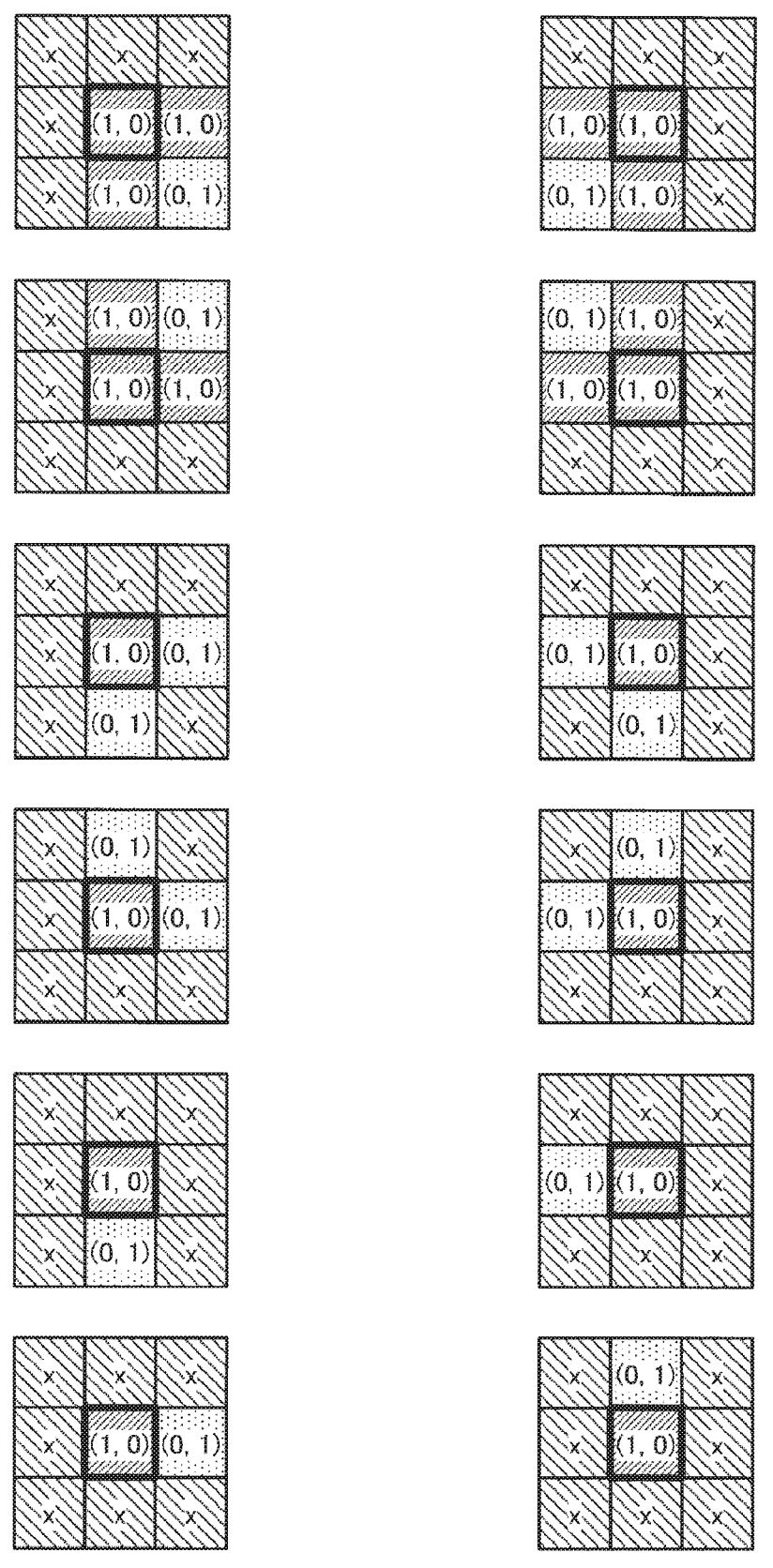

Referring now to FIGS. 32A through 32C, a description is given of some examples of the detection pattern as a second type of detection pattern.

FIG. 32A is a diagram of a first example of the detection pattern. FIG. 32B is a second example of the detection pattern. FIG. 32C is a diagram of a third example of the detection pattern.

Specifically, FIGS. 32A and 32B illustrate examples of the detection pattern to detect a pixel forming a corner of the specific object (i.e., line, text, or graphical shape). FIG. 32C illustrates examples of the detection pattern to detect a pixel forming an edge portion of the specific object (i.e., line, text, or graphical shape), that is, a boundary between the specific object and the background.

In FIGS. 32A through 32C, a pixel corresponding to the target pixel (i.e., pixel subjected to edge enhancement) is a black pixel located in the center of the matrix in each example of the detection pattern. As illustrated in FIGS. 32A through 32C, the tag information 0 is assigned to the black pixel corresponding to the target pixel.

Figure 33A:
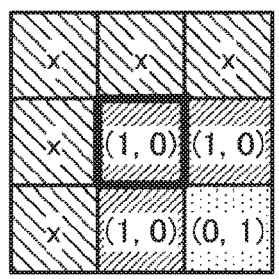
FIG. 33A is a diagram of a detection pattern corresponding to an upper-left detection pattern of FIG. 32A.
Figure 33B:
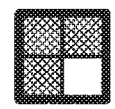
FIG. 33B is a target pixel converted as a result of image processing associated with the detection pattern of FIG. 33A.
Figure 34A:
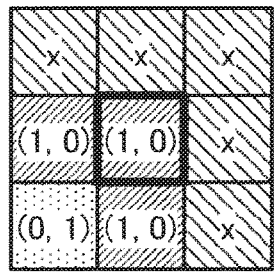
FIG. 34A is a diagram of a detection pattern corresponding to an upper-right detection pattern of FIG. 32A.
Figure 34B:
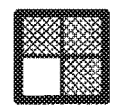
FIG. 34B is a target pixel converted as a result of image processing associated with the detection pattern of FIG. 34A.
Figure 35A:
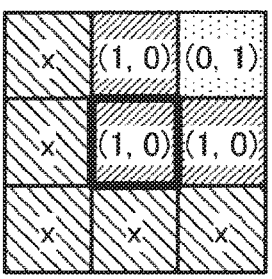
FIG. 35A is a diagram of a detection pattern corresponding to a lower-left detection pattern of FIG. 32A.
Figure 35B:
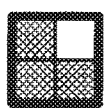
FIG. 35B is a target pixel converted as a result of image processing associated with the detection pattern of FIG. 35A.
Figure 36A:
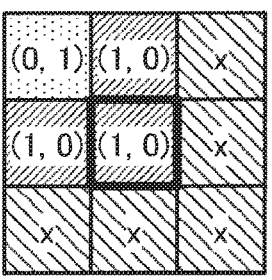
FIG. 36A is a diagram of a detection pattern corresponding to a lower-right detection pattern of FIG. 32A.
Figure 36B:
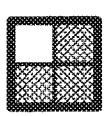
FIG. 36B is a target pixel converted as a result of image processing associated with the detection pattern of FIG. 36A.

For example, if the image matrix matches a detection pattern illustrated in FIG. 33A corresponding to an upper-left detection pattern of FIG. 32A, and if the second image data converter 3263 performs image processing associated with the detection pattern of FIG. 33A, the target pixel included in the image matrix is converted into the target pixel illustrated in FIG. 33B. FIGS. 34A through 44B are diagrams similar to the diagrams of FIGS. 33A and 33B. Specifically, FIG. 34A illustrates a detection pattern corresponding to an upper-right detection pattern of FIG. 32A. If the second image data converter 3263 performs image processing associated with the detection pattern of FIG. 34A, the target pixel included in the image matrix is converted into the target pixel illustrated in FIG. 34B. FIG. 35A illustrates a detection pattern corresponding to a lower-left detection pattern of FIG. 32A. If the second image data converter 3263 performs image processing associated with the detection pattern of FIG. 35A, the target pixel included in the image matrix is converted into the target pixel illustrated in FIG. 35B. FIG. 36A illustrates a detection pattern corresponding to a lower-right detection pattern of FIG. 32A. If the second image data converter 3263 performs image processing associated with the detection pattern of FIG. 36A, the target pixel included in the image matrix is converted into the target pixel illustrated in FIG. 36B.

Figure 37A:
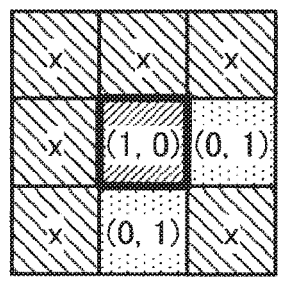
FIG. 37A is a diagram of a detection pattern corresponding to an upper-left detection pattern of FIG. 32B.
Figure 37B:
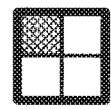
FIG. 37B is a target pixel converted as a result of image processing associated with the detection pattern of FIG. 37A.
Figure 38A:
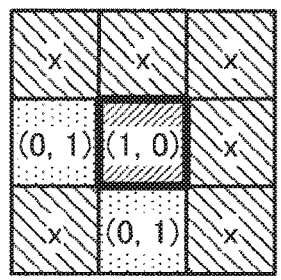
FIG. 38A is a diagram of a detection pattern corresponding to an upper-right detection pattern of FIG. 32B.
Figure 38B:
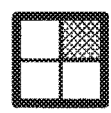
FIG. 38B is a target pixel converted as a result of image processing associated with the detection pattern of FIG. 38A.
Figure 39A:
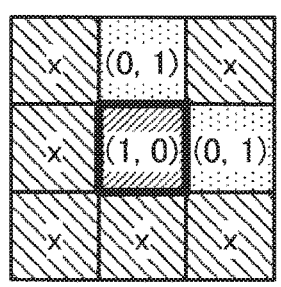
FIG. 39A is a diagram of a detection pattern corresponding to a lower-left detection pattern of FIG. 32B.
Figure 39B:
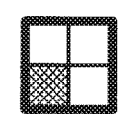
FIG. 39B is a target pixel converted as a result of image processing associated with the detection pattern of FIG. 39A.
Figure 40A:
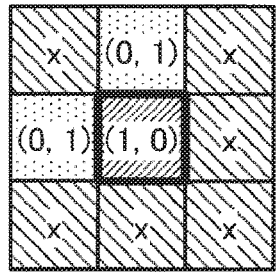
FIG. 40A is a diagram of a detection pattern corresponding to a lower-right detection pattern of FIG. 32B.
Figure 40B:
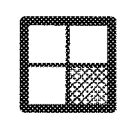
FIG. 40B is a target pixel converted as a result of image processing associated with the detection pattern of FIG. 40A.

FIG. 37A illustrates a detection pattern corresponding to an upper-left detection pattern of FIG. 32B. If the second image data converter 3263 performs image processing associated with the detection pattern of FIG. 37A, the target pixel included in the image matrix is converted into the target pixel illustrated in FIG. 37B. FIG. 38A illustrates a detection pattern corresponding to an upper-right detection pattern of FIG. 32B. If the second image data converter 3263 performs image processing associated with the detection pattern of FIG. 38A, the target pixel included in the image matrix is converted into the target pixel illustrated in FIG. 38B. FIG. 39A illustrates a detection pattern corresponding to a lower-left detection pattern of FIG. 32B. If the second image data converter 3263 performs image processing associated with the detection pattern of FIG. 39A, the target pixel included in the image matrix is converted into the target pixel illustrated in FIG. 39B. FIG. 40A illustrates a detection pattern corresponding to a lower-right detection pattern of FIG. 32B. If the second image data converter 3263 performs image processing associated with the detection pattern of FIG. 40A, the target pixel included in the image matrix is converted into the target pixel illustrated in FIG. 40B.

Figure 41A:
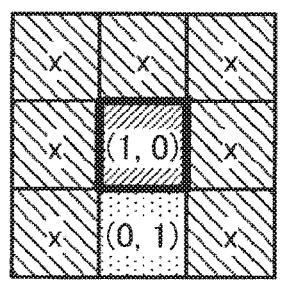
FIG. 41A is a diagram of a detection pattern corresponding to an upper-left detection pattern of FIG. 32C.
Figure 41B:
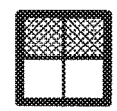
FIG. 41B is a target pixel converted as a result of image processing associated with the detection pattern of FIG. 41A.
Figure 42A:
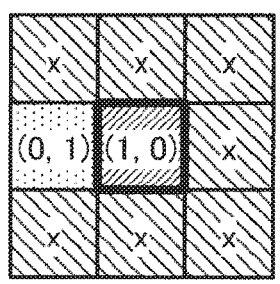
FIG. 42A is a diagram of a detection pattern corresponding to an upper-right detection pattern of FIG. 32C.
Figure 42B:
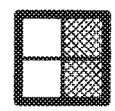
FIG. 42B is a target pixel converted as a result of image processing associated with the detection pattern of FIG. 42A.
Figure 43A:
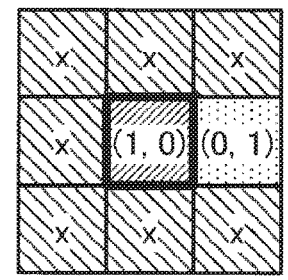
FIG. 43A is a diagram of a detection pattern corresponding to a lower-left detection pattern of FIG. 32C.
Figure 43B:
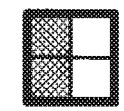
FIG. 43B is a target pixel converted as a result of image processing associated with the detection pattern of FIG. 43A.
Figure 44A:
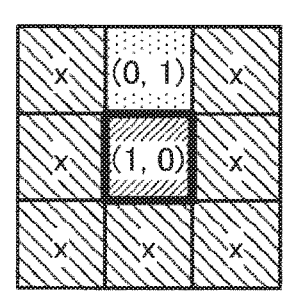
FIG. 44A is a diagram of a detection pattern corresponding to a lower-right detection pattern of FIG. 32C.
Figure 44B:
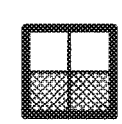
FIG. 44B is a target pixel converted as a result of image processing associated with the detection pattern of FIG. 44A.

FIG. 41A illustrates a detection pattern corresponding to an upper-left detection pattern of FIG. 32C. If the second image data converter 3263 performs image processing associated with the detection pattern of FIG. 41A, the target pixel included in the image matrix is converted into the target pixel illustrated in FIG. 41B. FIG. 42A illustrates a detection pattern corresponding to an upper-right detection pattern of FIG. 32C. If the second image data converter 3263 performs image processing associated with the detection pattern of FIG. 42A, the target pixel included in the image matrix is converted into the target pixel illustrated in FIG. 42B. FIG. 43A illustrates a detection pattern corresponding to a lower-left detection pattern of FIG. 32C. If the second image data converter 3263 performs image processing associated with the detection pattern of FIG. 43A, the target pixel included in the image matrix is converted into the target pixel illustrated in FIG. 43B. FIG. 44A illustrates a detection pattern corresponding to a lower-right detection pattern of FIG. 32C. If the second image data converter 3263 performs image processing associated with the detection pattern of FIG. 44A, the target pixel included in the image matrix is converted into the target pixel illustrated in FIG. 44B.

In the present embodiment, the priority is established in advance between three groups formed by FIGS. 32A through 32C, respectively. For example, the group of FIG. 32A precedes the group of FIG. 32B, and the group of FIG. 32B precedes the group of FIG. 32C. If a plurality of groups includes a detection pattern that matches the image matrix, the second image data converter 3263 may perform image processing associated with the detection pattern belonging to one of the groups taking top priority.

Figure 45:
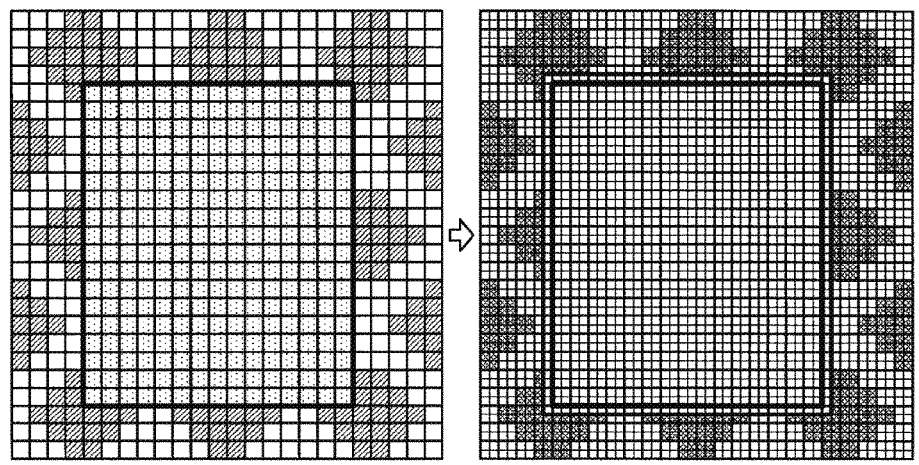
FIG. 45 is a diagram of image processing by which an outlined quadrangle is drawn as a specific object on a dithering-pattern background.

Referring now to FIG. 45, a description is given of an example of image processing.

FIG. 45 is a diagram of image processing by which an outlined quadrangle is drawn as a specific object on a dithering-pattern background.

In the present example, the tag information 1 is assigned to each of white pixels constructing the outlined graphical shape (i.e., outlined quadrangle). By contrast, the tag information 0 is assigned to each of black and white pixels constructing the background that includes a dithering pattern. As described above, the detection pattern that is used for the pattern matching performed by the pattern matching unit 3262 includes a plurality of pixels each including the 1-bit first pixel value indicating the image information and the 1-bit second pixel value indicating the tag information. That is, each of the first pixel value and the second pixel value is represented by 1 bit. The detection pattern is a pattern to detect a pixel forming an edge portion in which each of the first pixel value and the second pixel value varies between pixels. Therefore, the pattern matching unit 3262 does not detect a boundary between a black pixel and a white pixel within the background. Instead, the pattern matching unit 3262 detects the edge portion (i.e., boundary) between the target area in which the outlined graphical shape is drawn and the background (i.e., black pixels in the dithering pattern) in the pattern matching by use of the detection pattern. Accordingly, the line thinning is performed only on the pixel forming the edge portion (i.e., boundary) between the target area and the background. That is, in the present example, the line thinning is performed only on each of the black pixels to which the tag information 0 is assigned. Specifically, the line thinning includes removal of the black pixels to which the tag information 0 is assigned, to expand the outlined graphical shape. In other words, the line thinning is not performed on a pixel forming the boundary between a black pixel and a white pixel within the background. Accordingly, the edge enhancement can be performed without causing unexpected changes in image density.

Referring back to FIG. 16, a description is now resumed of the structure of the resolution converter 3252. The normal pattern converter 3264 is an example of a "third image data converter". The normal pattern converter 3264, as a third image data converter, performs the resolution conversion on the target pixel to convert the target pixel into image data having the second resolution (herein referred to as third image data). Hereinafter, the image data acquired by the resolution conversion performed by the normal pattern converter 3264 is referred to as a normal pattern. In the present embodiment, the normal pattern converter 3264 outputs the normal pattern, on which the line thinning or smoothing processing is not performed. The normal pattern is represented by 4-bit data having a resolution of 2400 dpi in the main scanning direction and 1-bit data having a resolution of 4800 dpi in the sub-scanning direction, as the image information and the tag information each having the second resolution. The normal pattern converter 3264 transmits the normal pattern to the selector 3268.

The selector 3268 is an example of a "selector". The selector 3268, as a selector, selects either of the first image processing pattern (i.e., second image data) received from the second image data converter 3263 and the normal pattern (i.e., third image data) received from the normal pattern converter 3264. In the present example, the selector 3268 selects the first image processing pattern if the selector 3268 receives the enable signal described above. By contrast, if the selector 3268 does not receive the enable signal, the selector 3268 selects the normal pattern.

The resolution converter 3252 having a configuration described above converts image data having the first resolution into image data having the second resolution. In addition, the resolution converter 3252 performs image processing on an edge of text, a line, or the like. For example, the resolution converter 3252 can thin a black text or a black line. Alternatively, the resolution converter 3252 can thicken an outlined text or an outlined line. In this case, the resolution converter 3252 may thin a black line.

Figure 46:
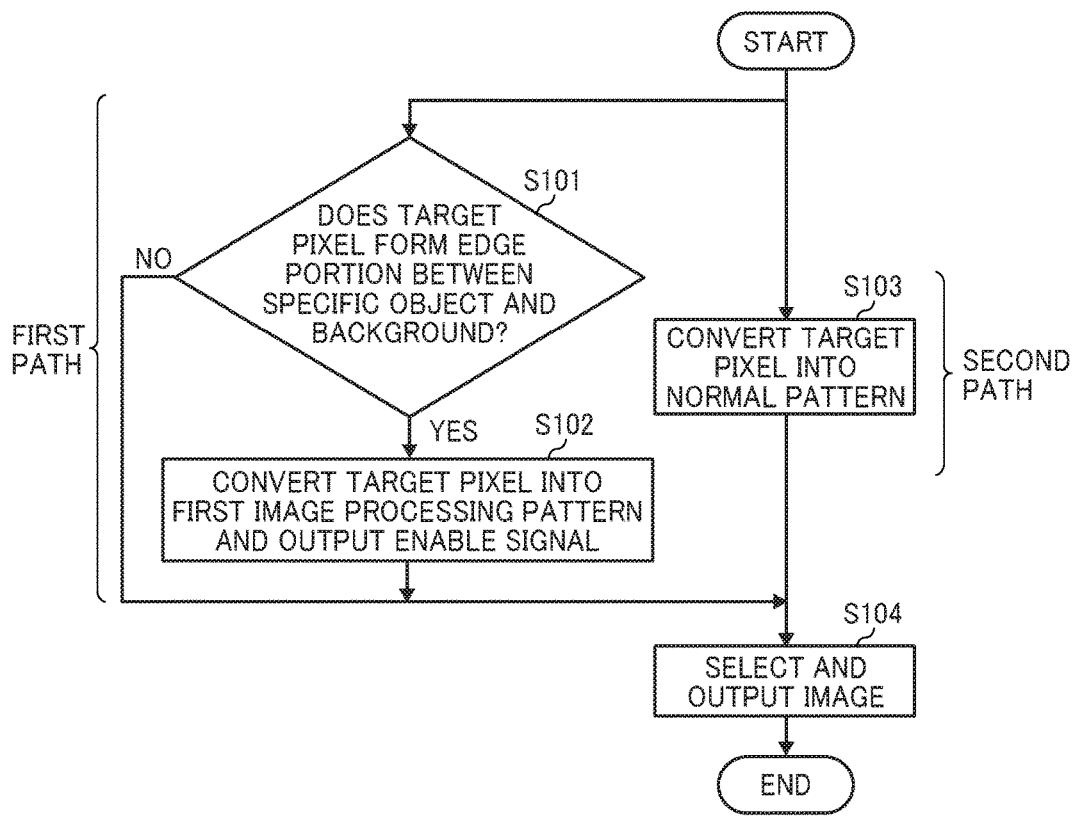
FIG. 46 is a flowchart of an example of processing performed by the resolution converter.

Referring now to FIG. 46, a description is given of a flow of processing performed by the resolution converter 3252.

FIG. 46 is a flowchart of an example of processing performed by the resolution converter 3252 when a target pixel is selected, that is, when the image matrix acquisition unit 3261 acquires an image matrix including the target pixel.

FIG. 46 illustrates a first path and a second path parallel to each other. The first path is processing performed by the pattern matching unit 3262 and the second image data converter 3263. The second path is processing performed by the normal pattern converter 3264. Since contents of steps are described in detail as above, a brief description is now given below.

Initially, a description is given of the first path. In step S101, the pattern matching unit 3262 determines whether the target pixel forms an edge portion (i.e., boundary) between a specific object and a background. Specifically, as described above, the pattern matching unit 3262 determines whether one or more detection patterns match the image matrix acquired by the image matrix acquisition unit 3261, thereby determining whether the target pixel included in the image matrix forms the edge portion (i.e., boundary) between the specific object and the background.

If the pattern matching unit 3262 determines that the target pixel forms the edge portion (i.e., boundary) between the specific object and the background (YES in S101), then, the second image data converter 3263 converts the target pixel into the first image processing pattern and outputs an enable signal in step S102. Then, the process goes to step S104 described later. By contrast, if the pattern matching unit 3262 determines that the target pixel does not form the edge portion (i.e., boundary) between the specific object and the background (NO in S101), then, the process goes to step S104.

Now, a description is given of the second path.

The normal pattern converter 3264 converts the target pixel into the normal pattern in step S103. Then, the process goes to step S104.

In step S104, the selector 3268 selects and outputs an image or image data. As described above, the selector 3268 selects and outputs the first image processing pattern if the selector 3268 receives the enable signal. By contrast, if the selector 3268 does not receive the enable signal, the selector 3268 selects and outputs the normal pattern.

As described above, in the present embodiment, the pattern matching unit 3262 determines whether one or more detection patterns match the image matrix including a target pixel. Each of the one or more detection patterns includes a plurality of pixels. Each of the plurality of pixels includes the first pixel value indicating the image information and the second pixel value indicating the tag information. In other words, the second pixel value indicates whether each of the plurality of pixels is an area in which the specific object is drawn. Each of the one or more detection patterns is a pattern to detect a pixel forming an edge portion in which each of the first pixel value and the second pixel value varies between pixels. Accordingly, the pixel forming the edge portion (i.e., boundary) between the specific object and the background can be detected. The line thinning is performed only on the pixel thus detected. That is, even when a specific object is drawn by dots, for example, a pixel forming an edge portion (i.e., boundary) between a black pixel and a white pixel illustrating the specific object is not detected as an object to be processed. In short, the line thinning is not performed on the pixel forming the edge portion (i.e., boundary) between the black pixel and the white pixel within the specific object. Accordingly, the line thinning (i.e., edge enhancement) can be performed without affecting the density of the specific object. Accordingly, the edge enhancement can be performed without causing unexpected changes in image density.

Referring now to FIGS. 47A through 51, a description is given of a variation of the first embodiment.

The intensity of the line thinning can be changed as appropriate.

FIGS. 47A and 47B illustrate examples of image processing including the line thinning and the resolution conversion performed on pixels constructing edge portions (i.e., boundaries) between the specific object and the background in a lateral direction. The line thinning is performed with different intensities between FIGS. 47A and 47B. FIGS. 47C and 47D illustrate examples of image processing including the line thinning and the resolution conversion performed on pixels constructing edge portions (i.e., boundaries) between the specific object and the background in a vertical direction. The line thinning is performed with different intensities between FIGS. 47C and 47D.

In addition, for example, the intensity of the line thinning associated with the detection pattern to detect a pixel forming the edge portion in the lateral direction can be different from the intensity of the line thinning associated with the detection pattern to detect a pixel forming the edge portion in the vertical direction.

Figures 48A, 48B, 49A, 49B:
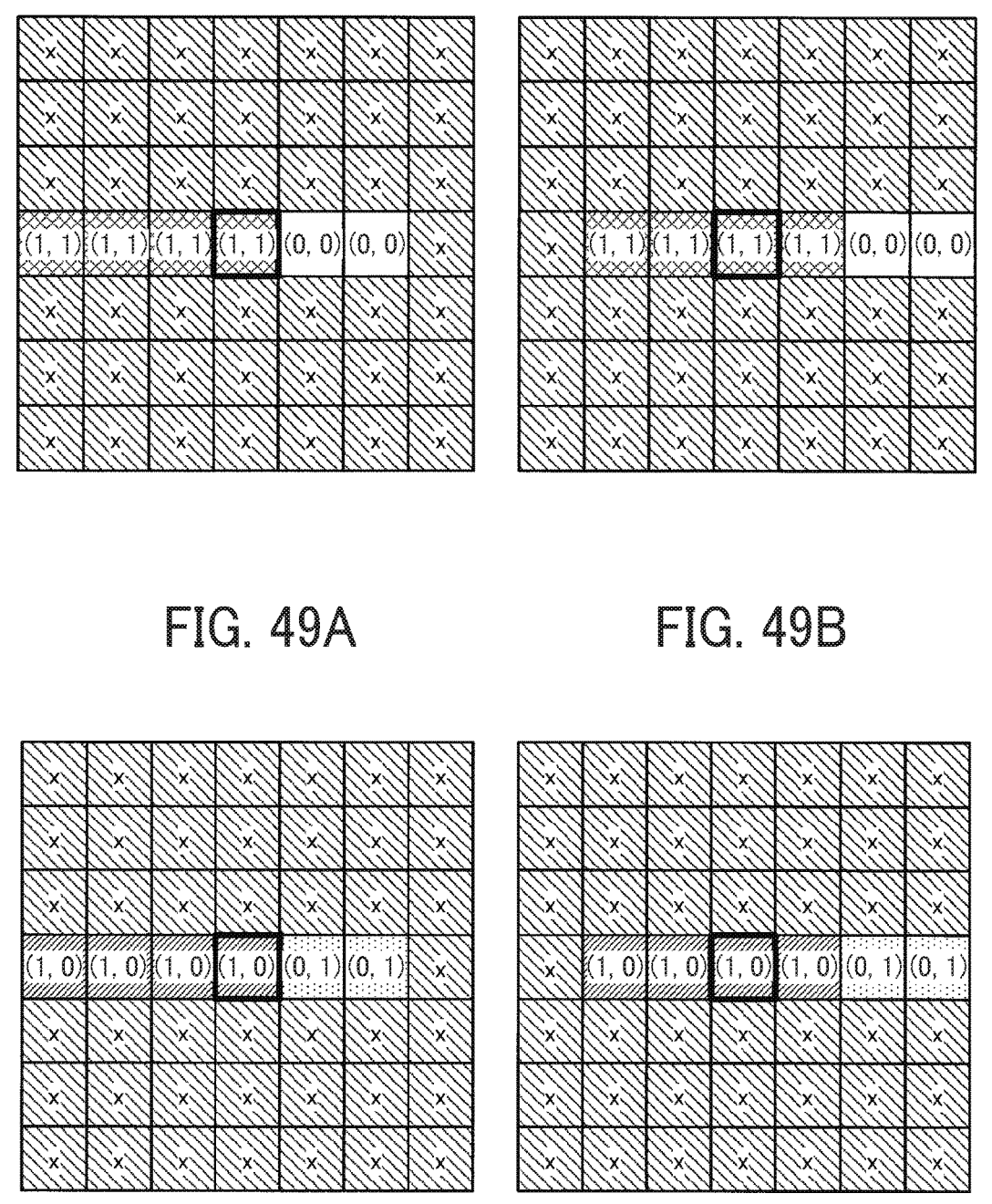

In the first embodiment described above, a far-end pixel of the edge portion is defined as a pixel subjected to the edge enhancement (i.e., target pixel). Alternatively, for example, the far-end pixel and a pixel adjacent to and disposed inside the far-end pixel, that is, in a direction away from the edge portion, may be defined as pixels subjected to the edge enhancement. It is to be noted that the far-end pixel is herein referred to as a far-edge pixel. The pixel adjacent to and disposed inside the far-end pixel is herein referred to as an adjacent edge pixel. For example, as detection patterns to detect a pixel forming an edge portion (i.e., boundary) between a black pixel (i.e., text, line, or graphical shape) and a white pixel (i.e., background), a detection pattern to detect the far-edge pixel as illustrated in FIG. 48A and a detection pattern to detect the adjacent edge pixel as illustrated in FIG. 48B may be prepared in advance. Each of FIGS. 48A and 48B illustrates a 7×7 matrix pattern. However, the size of the matrix pattern is not limited to the 7×7 matrix pattern. The size of the detection pattern (i.e., size of the image matrix) can be changed as appropriate.

Alternatively, as detection patterns to detect a pixel forming an edge portion (i.e., boundary) between a white pixel (i.e., text, line, or graphical shape) and a black pixel (i.e., background), a detection pattern to detect the far-edge pixel as illustrated in FIG. 49A and a detection pattern to detect the adjacent edge pixel as illustrated in FIG. 49B may be prepared in advance. Each of FIGS. 49A and 49B illustrates a 7×7 matrix pattern. However, the size of the matrix pattern is not limited to the 7×7 matrix pattern. The size of the detection pattern (i.e., size of the image matrix) can be changed as appropriate.

The intensity of the line thinning to thin a black text line may be different from the intensity of the line thinning to thin black pixels of the background when a white text line is thickened.

Figure 50:
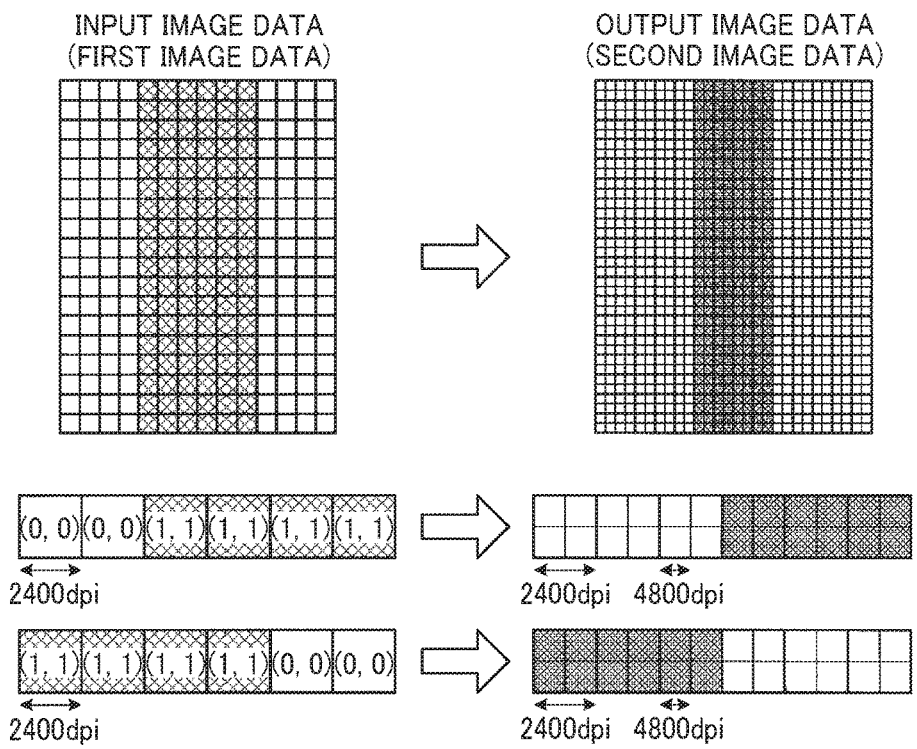
FIG. 50 is a diagram of an example of image processing including the line thinning performed on input image data including pixels forming an edge portion between a black text line and a background.

FIG. 50 is a diagram of an example of image processing including the line thinning performed on input image data (i.e., first image data) including pixels forming an edge portion, in this case, in the lateral direction, between a black text line and a background (i.e., white pixels). Specifically, each block of pixels illustrated on a left side of FIG. 50 includes a pixel (i.e., black target pixel) forming the edge portion (i.e., boundary) between the black text line and the background in the lateral direction. The image processing is performed on the target black pixel.

Figure 51:
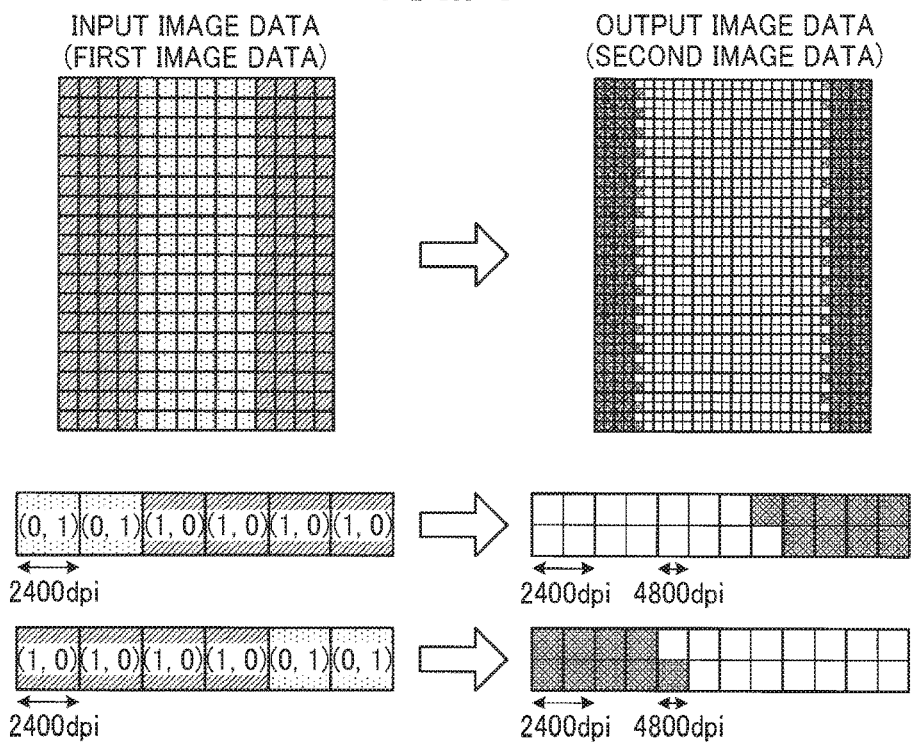
FIG. 51 is a diagram of an example of image processing including the line thinning performed on input image data including pixels forming an edge portion between a white text line and a background.

By contrast, FIG. 51 is a diagram of an example of image processing including the line thinning performed on input image data (i.e., first image data) including pixels forming an edge portion, in this case, in the lateral direction, between a white text line and a background (i.e., black pixels). Specifically, each block of pixels illustrated on a left side of FIG. 51 includes a pixel (i.e., black target pixel) forming the edge portion (i.e., boundary) between the white text line and the background in the lateral direction. The image processing is performed on the target black pixel.

Now, a description is given of a second embodiment of the present disclosure.

Any description of the second embodiment redundant with the above-description of the first embodiment is herein omitted unless otherwise required.

Figure 52:
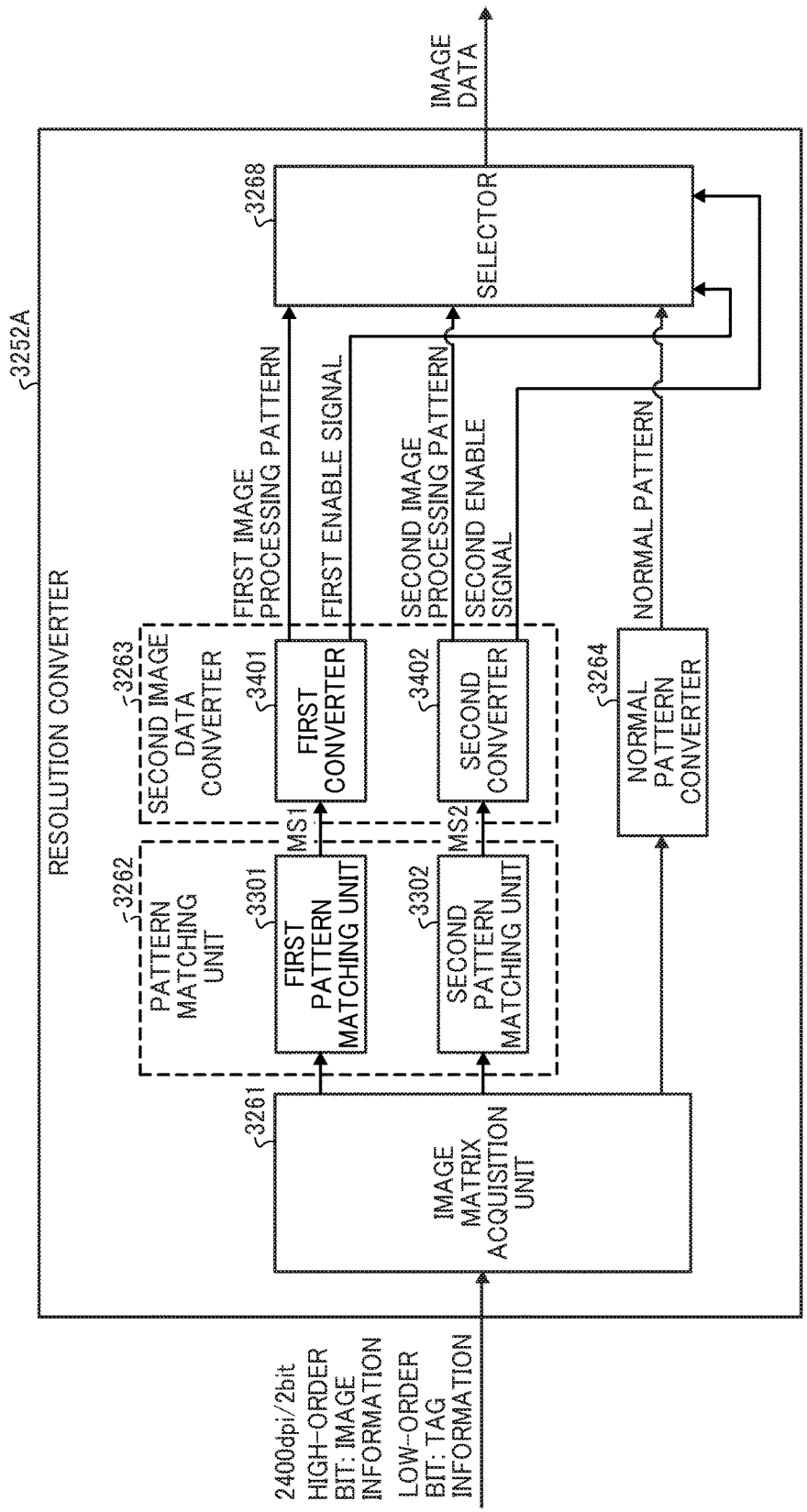
FIG. 52 is a block diagram of a resolution converter according to a second embodiment.

Referring now to FIG. 52, a description is given of a structure of a resolution converter 3252A according to the second embodiment.

FIG. 52 is a block diagram of the resolution converter 3252A.

As illustrated in FIG. 52, the pattern matching unit 3262 of the present embodiment includes, e.g., a first pattern matching unit 3301 and a second pattern matching unit 3302. The second image data converter 3263 includes a first converter 3401 and a second converter 3402.

Initially, a description is given of the first pattern matching unit 3301 and the first converter 3401. The first pattern matching unit 3301 determines whether one or more first detection patterns match the image matrix acquired by the image matrix acquisition unit 3261. Each of the one or more first detection patterns is a pattern to detect a pixel forming the edge portion, that is, the boundary between the specific object and the background. In the present embodiment, the function of the first pattern matching unit 3301 is identical to the function of the pattern matching unit 3262 of the first embodiment described above. If the first pattern matching unit 3301 determines that the target pixel forms the edge portion, the first pattern matching unit 3301 transmits a first matching signal MS1 to the first converter 3401 to identify the location of the image information and the tag information within the image matrix. It is to be noted that the first matching signal MS1 is equivalent to the matching signal MS of the first embodiment described above. By contrast, if the first pattern matching unit 3301 determines that the target pixel does not form the edge portion, the first pattern matching unit 3301 does not transmit the first matching signal MS1 to the first converter 3401.

If the image matrix matches any of the one or more first detection patterns, the first converter 3401 performs the line thinning, as the edge enhancement, and the resolution conversion on the target pixel to convert the target pixel into the second image data (i.e., first image processing pattern). In the present embodiment, the function of the first converter 3401 is equivalent to the function of the second image data converter 3263 of the first embodiment described above. In the present example, if the first converter 3401 receives the first matching signal MS1 from the first pattern matching unit 3301, the first converter 3401 performs image processing associated with the first detection pattern corresponding to the location of the image information and the tag information indicated by the first matching signal MS1 thus received. After performing the image processing associated with the first detection pattern that matches the image matrix, the first converter 3401 outputs the first image processing pattern acquired by the image processing to the selector 3268 together with a first enable signal. It is to be noted that first enable signal is equivalent to the enable signal of the first embodiment described above.

Now, a description is given of the second pattern matching unit 3302 and the second converter 3402.

The second pattern matching unit 3302 determines whether one or more second detection patterns match the image matrix acquired by the image matrix acquisition unit 3261. Each of the one or more second detection patterns is a pattern to detect a pixel forming a step (i.e., difference) and the edge portion described above. For example, the second pattern matching unit 3302 determines that the target pixel forms the step and the edge portion described above, that is, an edge portion of a difference between the specific object and the background, if the location of the image information and the tag information within the image matrix matches any of a plurality of second patterns registered in advance. If not, the second pattern matching unit 3302 determines that the target pixel does not form the step and the edge portion described above.

If the second pattern matching unit 3302 determines that the target pixel forms the step and the edge portion described above, the second pattern matching unit 3302 transmits a second matching signal MS2 to the second converter 3402 to identify the location of the image information and the tag information within the image matrix. By contrast, if the second pattern matching unit 3302 determines that the target pixel does not form the step and the edge portion described above, the second pattern matching unit 3302 does not transmit the second matching signal MS2 to the second converter 3402.

If the image matrix matches any of the one or more second detection patterns, the second converter 3402 performs the line thinning and the smoothing processing, as the edge enhancement, and the resolution conversion on the target pixel to convert the target pixel into the second image data. It is to be noted that the smoothing processing is processing to level the step or to equalize the difference. The second converter 3402 performs image processing associated with the one or more second detection patterns that match the image matrix, with reference to second image processing information in which image processing corresponding to the line thinning, the smoothing processing, and the resolution conversion is associated with each of the one or more second detection patterns. In the present example, if the second converter 3402 receives the second matching signal MS2 from the second pattern matching unit 3302, the second converter 3402 performs image processing associated with the second detection pattern corresponding to the location of the image information and the tag information indicated by the second matching signal MS2. FIG. 52 illustrates a second image processing pattern, which is the image data having the second resolution (i.e., example of the second image data) acquired by the resolution conversion performed by the second converter 3402. After performing the image processing associated with the second detection pattern that matches the image matrix, the second converter 3402 outputs the second image processing pattern acquired by the image processing to the selector 3268 together with a second enable signal. Alternatively, for example, the second pattern matching unit 3302 may output the second enable signal to the selector 3268 after determining that the image matrix matches any of the one or more second detection patterns. In short, the selector 3268 receives the enable signal after the second converter 3402 performs conversion.

Figure 53A:
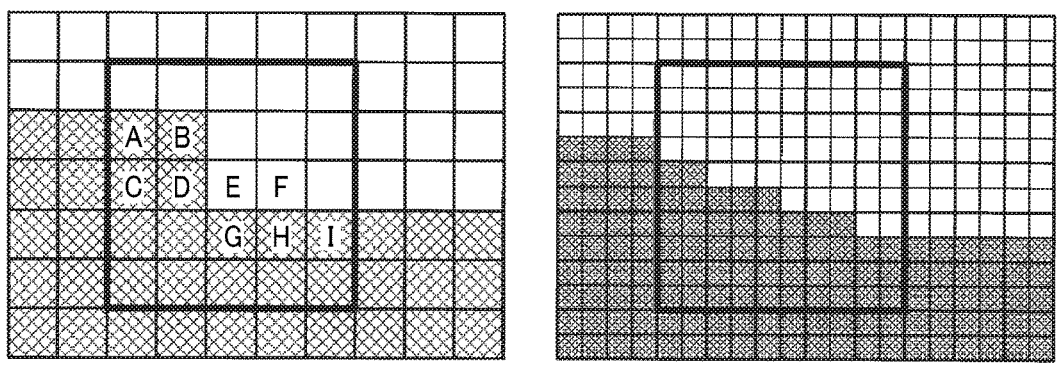
FIG. 53A is a diagram of image processing associated with a second detection pattern performed on image data that includes pixels forming a step and the edge portion.
Figure 53B:
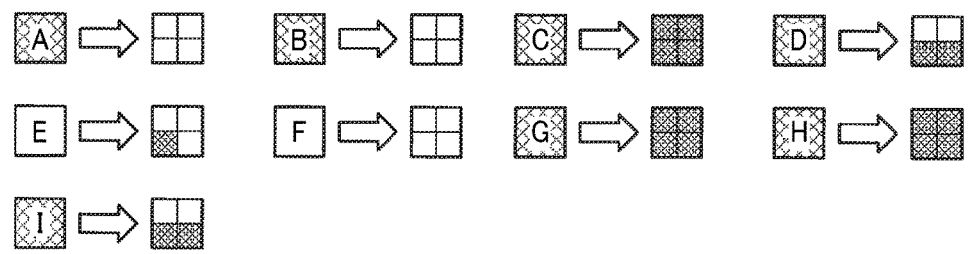
FIG. 53B is a diagram of the image processing performed on the pixels included in the image data of FIG. 53A.

For example, FIG. 53A illustrates image processing on image data that includes pixels A through I forming the step and the edge portion. FIG. 53B illustrates the image processing performed on each of the pixels A through I.

Figure 54:
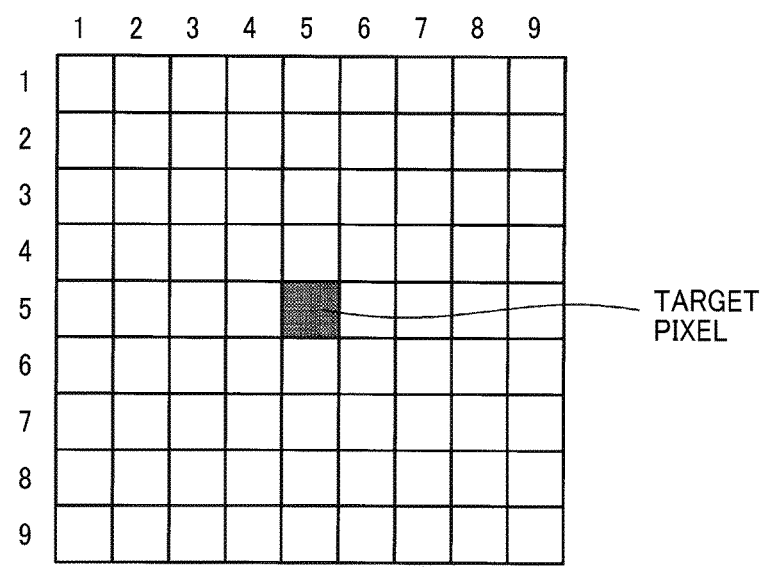
FIG. 54 is a diagram of a second example of the image matrix.

The image processing is associated with the second detection pattern that matches the image matrix including one of the pixels A through I as a target pixel. For example, the image processing performed on the pixel A is associated with the second detection pattern that matches the image matrix including the pixel A as a target pixel. In the present embodiment, as illustrated in FIG. 54, the image matrix is a 9×9 matrix pattern.

Figure 55A:
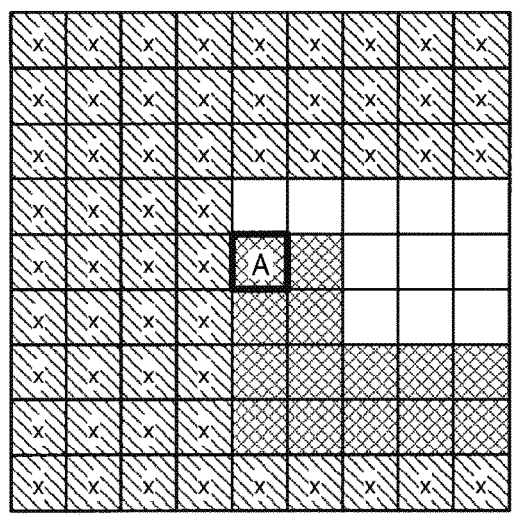
FIG. 55A is a diagram of a first example of the second detection pattern.
Figure 55B:
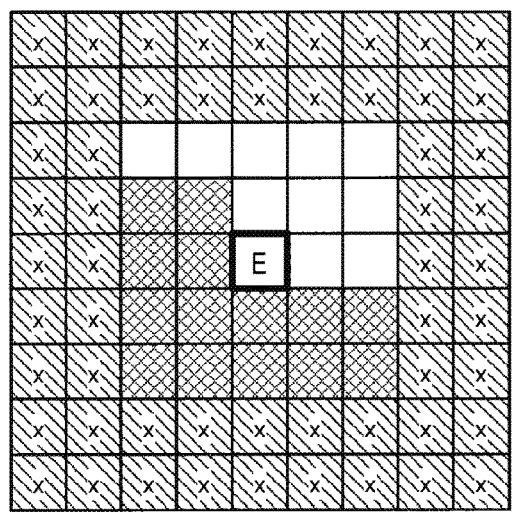
FIG. 55B is a second example of the second detection pattern.
Figure 55C:
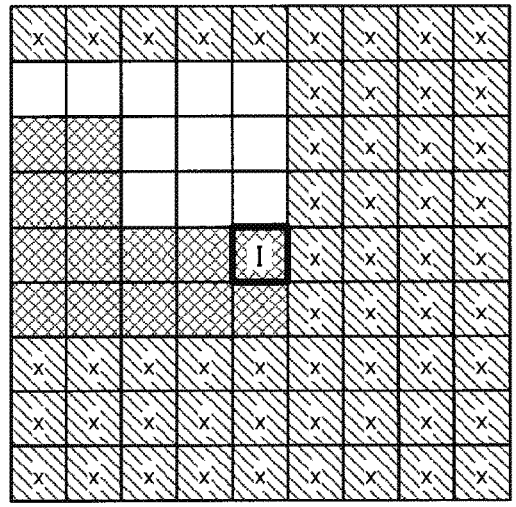
FIG. 55C is a diagram of a third example of the second detection pattern.

Referring now to FIGS. 55A through 55C, a description is given of some examples of the second detection pattern.

FIG. 55A is a diagram of a first example of the second detection pattern to detect the pixel A as a target pixel. FIG. 55B is a second example of the second detection pattern to detect the pixel E as a target pixel. FIG. 55C is a diagram of a third example of the second detection pattern to detect the pixel I as a target pixel.

In the present example, the pattern matching is performed by use of the second pattern in 9×9 matrix as illustrated in FIGS. 55A through 55C, to detect the pixel forming the step and the edge portion described above. Then, the image processing (i.e., line thinning, smoothing processing, resolution conversion) is performed. The image processing is associated with the second detection pattern that matches the image matrix including the pixel forming the step and the edge portion as a target pixel. Accordingly, each of the pixels A through I illustrated in FIG. 53A is converted as illustrated in FIG. 53B.

Referring back to FIG. 52, in the present embodiment, the selector 3268 selects the second image processing pattern if the selector 3268 receives both the first enable signal and the second enable signal. If the selector 3268 receives the first enable signal, but does not receive the second enable signal, the selector 3268 selects the first image processing pattern. If the selector 3268 receives the second enable signal, but does not receive the first enable signal, the selector 3268 selects the second image processing pattern. If the selector 3268 receives neither the first enable signal nor the second enable signal, the selector 3268 selects the normal pattern.

According to the embodiments described above, edge enhancement can be performed without affecting image density.

Although the present disclosure makes reference to specific embodiments, it is to be noted that the present disclosure is not limited to the details of the embodiments described above and various modifications and enhancements are possible without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Any one of the above-described operations may be performed in various other ways, for example, in an order different from the one described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored in any kind of storage medium. Examples of storage mediums include, but are not limited to, flexible disk, hard disk, optical discs, magneto-optical discs, magnetic tapes, nonvolatile memory cards, read only memory (ROM), etc.

Alternatively, any one of the above-described and other methods of the present disclosure may be implemented by an application specific integrated circuit (ASIC), prepared by interconnecting an appropriate network of conventional component circuits or by a combination thereof with one or more conventional general purpose microprocessors and/or signal processors programmed accordingly.

What is claimed is:

1. An image processing device comprising circuitry to:
acquire an image matrix corresponding to an area, including a target pixel and pixels surrounding the target pixel, from first image data having a first resolution, the first image data including a plurality of pixels, each of the plurality of pixels including a first pixel value indicating image information and a second pixel value indicating whether or not each of the plurality of pixels is an area in which an object is drawn;
determine whether one or more detection patterns match the image matrix acquired, the one or more detection patterns each including a plurality of pixels, the plurality of pixels each including the first pixel value and the second pixel value, the one or more detection patterns including first patterns to detect a pixel forming an edge portion in which each of the first pixel value and the second pixel value varies between pixels and including second patterns to detect a pixel forming a step and the edge portion; and
perform edge enhancement on the target pixel and perform resolution conversion on the target pixel to convert the first resolution into a second resolution, relatively higher than the first resolution, to convert the target pixel into second image data, in response to a match between the image matrix and one or more of the one or more first detection patterns or second detection patterns being determined, wherein
in response to a match between the image matrix and one or more of the one or more first detection patterns being determined,
line thinning is performed on the target pixel as the edge enhancement, and
resolution conversion is performed to convert the target pixel into the second image data; and
in response to a match between the image matrix and one or more of the one or more second detection patterns being determined,
line thinning and smoothing processing are performed on the target pixel as the edge enhancement, and
resolution conversion is performed to convert the target pixel into the second image data.

2. The image processing device of claim 1, wherein each of the first pixel value and the second pixel value is represented by 1 bit.

3. The image processing device of claim 1, wherein the object is any one of text, a line, and a graphical shape.

4. The image processing device of claim 1,
wherein, the circuitry is configured to perform image processing associated with the one or more detection patterns determined to match the image matrix, with reference to image processing information in which image processing corresponding to the line thinning and the resolution conversion is associated with each of the one or more detection patterns.

5. The image processing device of claim 1, wherein the circuitry further is configured to
perform the resolution conversion on the target pixel to convert the target pixel into third image data, and
select either the second image data or third image data.

6. The image processing device of claim 1, wherein the circuitry further is configured to
perform the resolution conversion on the target pixel to convert the target pixel into third image data, and
select one of
the second image data acquired by the resolution conversion performed in response to a match between the image matrix and one or more of the one or more first detection patterns being determined,
the second image data acquired by the resolution conversion performed in response to a match between the image matrix and one or more of the one or more second detection patterns being determined, and
the third image data.

7. A drive control device comprising:
the image processing device of claim 1;
a generator to receive the second image data from the image processing device, to generate a modulation signal to control activation of a light source from the second image data; and
a light source driver to drive the light source according to the modulation signal generated by the generator.

8. The drive control device of claim 7, wherein an integrated device includes the image processing device, the generator, and the light source driver.

9. A light source control device comprising:
an interface unit to acquire image data;
a processor to perform image processing on the image data acquired by the interface unit to acquire first image data; and
the drive control device of claim 7 to receive the first image data acquired by the image processing performed by the processor.

10. An image forming apparatus comprising:
the light source control device of claim 9;
the light source driven and controlled by the light source control device;
an image bearer on which a latent image is configured to be written according to light emission of the light source;
a developing device to supply toner to the latent image upon being written on the image bearer to develop the latent image into a visible toner image;
a transfer device to transfer the visible toner image, into which the latent image is developed by the developing device, onto a recording medium; and
a fixing device to fix the toner image transferred by the transfer device onto the recording medium.

11. An image processing device comprising:
acquiring means for acquiring an image matrix corresponding to an area including a target pixel and pixels surrounding the target pixel from first image data having a first resolution, the first image data including a plurality of pixels, each of the plurality of pixels including a first pixel value indicating image information and a second pixel value indicating whether or not each of the plurality of pixels is an area in which an object is drawn;
first pattern matching means for determining whether one or more first detection patterns match the image matrix, each of the one or more first detection patterns being a pattern to detect a pixel forming an edge portion in which each of the first pixel value and the second pixel value varies between pixels; and
second pattern matching means for determining whether one or more second detection patterns match the image matrix, each of the one or more second detection patterns being a pattern to detect a pixel forming a step and the edge portion;
first image data converting means for performing line thinning on the target pixel, and performing resolution conversion to convert the first resolution into a second resolution relatively higher than the first resolution, to convert the target pixel into second image data, in response to a match between the image matrix and one or more first detection patterns being determined by the first pattern matching means; and second image data converting means for performing line thinning and smoothing processing on the target pixel, and performing resolution conversion to convert the first resolution into the second resolution, to convert the target pixel into second image data, in response to a match between the image matrix and one or more of the one or more second detection patterns being determined by the second pattern matching means.

12. The image processing device of claim 11,
wherein the second image data converting means performs image processing associated with the one or more detection patterns determined to match the image matrix, with reference to image processing information in which image processing corresponding to the line thinning and the resolution conversion is associated with each of the one or more detection patterns determined to match the image matrix.

13. The image processing device of claim 11, further comprising:
third image data converting means for performing the resolution conversion on the target pixel to convert the target pixel into third image data; and
selecting means for selecting the second image data or the third image data.

14. The image processing device of claim 11, further comprising:
third image data converting means for performing the resolution conversion on the target pixel to convert the target pixel into third image data; and
selecting means for selecting one of the second image data acquired by the resolution conversion performed by the first converting means, the second image data acquired by the resolution conversion performed by the second converting means, and the third image data.

15. A method for processing an image, the method comprising:
acquiring an image matrix corresponding to an area including a target pixel and pixels surrounding the target pixel from first image data having a first resolution, the first image data including a plurality of pixels, each of the plurality of pixels including a first pixel value indicating image information and a second pixel value indicating whether or not each of the plurality of pixels is an area in which an object is drawn;
determining whether one or more first detection patterns match the image matrix, each of the one or more first detection patterns being a pattern to detect a pixel forming an edge portion in which each of the first pixel value and the second pixel value varies between pixels;
determining whether one or more second detection patterns match the image matrix, each of the one or more second detection patterns being a pattern to detect a pixel forming a step and the edge portion;
performing line thinning on the target pixel, and performing resolution conversion to convert the first resolution into a second resolution, relatively higher than the first resolution, to convert the target pixel into second image data, in response to a match between the image matrix and one or more of the one or more first detection patterns being determined; and
performing the line thinning and smoothing processing on the target pixel, and performing resolution conversion to convert the first resolution into the second resolution, to convert the target pixel into second image data, in response to a match between the image matrix and one or more of the one or more second detection patterns being determined.

16. The method for processing an image of claim 15, further comprising:
performing the resolution conversion on the target pixel to convert the target pixel into third image data; and
selecting one of the second image data acquired by the resolution conversion performed in response to a match between the image matrix and one or more of the one or more first detection patterns being determined, the second image data acquired by the resolution conversion performed in response to a match between the image matrix and one or more of the one or more second detection patterns being determined, and the third image data.

17. A non-transitory computer readable medium including program segments for, when executed by at least one processor, configuring the at least one processor to perform the method of claim 15.

18. A drive control device comprising:
the image processing device of claim 11;
a generator to receive the second image data from the image processing device, to generate a modulation signal to control activation of a light source from the second image data; and
a light source driver to drive the light source according to the modulation signal generated by the generator.

19. A light source control device comprising:
an interface unit to acquire image data;
a processor to perform image processing on the image data acquired by the interface unit to acquire first image data; and
the drive control device of claim 18 to receive the first image data acquired by the image processing performed by the processor.

20. An image forming apparatus comprising:
the light source control device of claim 19;
the light source driven and controlled by the light source control device;
an image bearer on which a latent image is configured to be written according to light emission of the light source;
a developing device to supply toner to the latent image upon being written on the image bearer to develop the latent image into a visible toner image;
a transfer device to transfer the visible toner image, into which the latent image is developed by the developing device, onto a recording medium; and
a fixing device to fix the toner image transferred by the transfer device onto the recording medium.

* * * * *